(12) United States Patent
Sutera et al.

(10) Patent No.: US 12,204,410 B2
(45) Date of Patent: *Jan. 21, 2025

(54) INTEGRATED ERROR CORRECTION CODE (ECC) AND PARITY PROTECTION IN MEMORY CONTROL CIRCUITS FOR INCREASED MEMORY UTILIZATION

(71) Applicant: Ampere Computing LLC, Santa Clara, CA (US)

(72) Inventors: Massimo Sutera, Sunnyvale, CA (US); Nagi Aboulenein, King City, OR (US); Sandeep Brahmadathan, Dublin, CA (US)

(73) Assignee: Ampere Computing LLC, Santa Clara, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 17/707,636

(22) Filed: Mar. 29, 2022

(65) Prior Publication Data

US 2023/0315571 A1 Oct. 5, 2023

(51) Int. Cl.
*G06F 11/10* (2006.01)
*G06F 12/02* (2006.01)

(52) U.S. Cl.
CPC ........ *G06F 11/108* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 7,203,890 | B1 * | 4/2007 | Normoyle | G11C 8/00 |
| | | | | 714/766 |
| 9,183,085 | B1 * | 11/2015 | Northcott | G06F 11/1012 |
| 9,195,537 | B2 * | 11/2015 | Sharon | G11C 16/10 |
| 9,513,987 | B2 * | 12/2016 | Dao | G06F 11/1076 |

* cited by examiner

*Primary Examiner* — April Y Blair
*Assistant Examiner* — Matthew W Wahlin
(74) *Attorney, Agent, or Firm* — Withrow & Terranova, PLLC

(57) ABSTRACT

A codeword read from memory includes data blocks including data and supplemental blocks including error correction code (ECC) symbols for detecting and correcting data errors. Metadata can be stored in the supplemental blocks to increase memory utilization but using bits of the supplemental blocks for metadata leaves too few bits remaining for the ECC symbols. To maintain error protection, the supplemental blocks include ECC symbols to protect a first data portion of the codeword and parity bits configured to protect a second data portion of the codeword. Errors in the first data portion can be located and corrected using the ECC symbols. Errors in the second data portion can be detected by the parity. For example, the first data portion is encoded based on the second data portion, so locations of parity errors correspond to locations of symbol errors, and parity errors can be corrected.

25 Claims, 11 Drawing Sheets

INTEGRATED ERROR CORRECTION CODE (ECC) AND PARITY PROTECTION IN MEMORY CONTROL CIRCUITS FOR INCREASED MEMORY UTILIZATION

BACKGROUND

I. Field of the Disclosure

The technology of the disclosure relates generally to digital data storage in computer systems, and more particularly, to efficient utilization of memory capacity with high reliability.

II. Background

Many electronic devices employ some type of computer processor or data processing circuit that is controlled by computer software. Software includes instructions to be executed by a processing circuit and data that is processed by the processing circuit according to the instructions. The instructions and data are stored as binary data in memory circuits to be accessed by the processing circuit. Such memory circuits may be physically located in a same integrated circuit (IC) as a processor or in a separate memory circuit. Proper operation of the electronic device depends on having correct binary data. Therefore, it is important that the memory circuits maintain the integrity of stored binary for access by the processor. However, faults can occur in a memory circuit, causing stored data to be corrupted for a variety of reasons. Transient memory faults can be caused by electronic noise or high-energy particles, and more persistent memory faults can occur in memory circuits as they degrade over time. To reduce the chance of an electronic device incurring an operational fault due to erroneous data caused by memory circuit failures, processors and/or memory circuits employ error protection schemes that can detect data errors and even correct some data errors. In this manner, even if a memory circuit has a data error (e.g., one or more binary bits are flipped or their value cannot be determined), these errors can be corrected, and the corrected data can be provided to a processing circuit, allowing the processing circuit to continue operating normally.

Error protection schemes for data stored in memory circuits employ additional data bits ("error protection data") whose values are generated based on the binary data to be protected ("protected data"). These additional data bits can be parity bits, error-correction code (ECC) bits, ECC symbols, or other forms of error protection data. Error protection circuits use logic functions to generate and store the error protection data in memory circuits. An error protection circuit may be implemented in a memory controller that accesses the memory circuits and/or in the memory module itself. The error protection data can be generated by the error protection circuit when the protected data is stored to the memory circuits. Thereafter, when the protected data is retrieved from the memory circuits, the error protection data is also retrieved and used to verify that the retrieved protected data does not include bits that were changed while being stored in the memory. For a given error protection scheme, a higher level of error protection for the protected data (e.g., detection and/or correction of more bits) requires more error protection data bits. However, because error protection data bits are stored in a memory circuit and are transferred between the memory circuit and the memory controller, additional circuits and wires for error protection in a memory system can increase the overall sizes of ICs and memory modules. Thus, it would be advantageous to maintain or increase the level of error protection supported by a memory circuit while mitigating the amount of resources consumed in order to provide a desired level of error protection.

SUMMARY OF THE DISCLOSURE

Aspects disclosed in the detailed description include integrated error correction code (ECC) and parity in memory control circuits for increased memory utilization. Related methods of integrated error protection to increase memory utilization are also disclosed. The memory control circuit is provided as part of a memory system for a computer system that includes a memory module that includes one or more memory chips for storing data. The memory control circuit is configured to perform read and write access operations to the memory module. Each memory access operation transfers a plurality of codewords from the memory module to provide an ECC scheme, wherein the codewords each include multiple blocks of a specified number of bits. The number of blocks in each codeword corresponds to a number of memory chips in the memory module, and the memory module is configured to limit errors to one memory chip, which corresponds to one block in each codeword. The blocks that form a codeword include data blocks containing data stored into the memory module, for example, and supplemental blocks including ECC symbols to support detection and correction of errors in the data retrieved from the memory module. Utilization of the codeword of a given size can be increased by repurposing some of the bits in the supplemental blocks used for the ECC symbols with metadata associated with the data in the data blocks. However, if some of the bits in the supplemental blocks are used for metadata, the number of remaining bits in the supplemental blocks available for the ECC symbols is reduced, thus reducing the level of data protection in the data blocks.

In this regard, in exemplary aspects disclosed herein, to allow for some of the bits in the supplemental blocks to be used for a purpose other than error protection, some of the remaining bits in the supplemental block are used for ECC symbols employed to protect a first data portion of the data blocks of the codeword. Other remaining bits of the supplemental blocks are repurposed as parity bits to protect the metadata bits and a second data portion of the data blocks of the codeword. Errors in the first data portion of the data blocks can be located and corrected using the ECC symbols. The parity bits provide protection that includes detecting error(s) in the second data portion of the data blocks and the metadata bits.

Parity bits alone, however, cannot identify a location of the detected error(s) and, therefore, cannot be employed to fix the parity errors. In this regard, in another exemplary aspect disclosed herein, the first data portion of the data block, which is protected by the ECC symbols, is merged with the second data portion of the data block to generate a merged first data portion before the codeword is stored in the memory module in a write access operation. The merged first data portion in a codeword that is read back from the memory module is demerged using the second data portion. In this manner, any error in the second data portion produces an error in a corresponding location in the demerged first data portion. The parity bits are used to check for errors in the second data portion of the codeword. Since errors in the first data portion can be located and corrected using the ECC symbols, parity errors detected in the second data portion can also be located and, therefore, can be corrected. In some examples, merging the first data portion of each data block with the second data portion of the corresponding data block in a write access operation comprises the logical operation of exclusive-ORing (XORing) the first data portion with the second data portion to generate a merged first data portion. Demerging the merged first data portion of a codeword received from the memory module in a read access operation comprises XORing the merged first data portion of the codeword with the second data portion of the codeword. Protecting a codeword by configuring the supplemental blocks and merging the first data portion with the second data portion, as described above, allows some of the bits of the supplemental blocks to be repurposed as metadata bits to increase memory utilization without reducing the level of error protection.

In one exemplary aspect, a memory control circuit is provided that comprises a decode circuit configured to receive a codeword comprising a first data portion, a plurality of ECC symbols, a second data portion; a plurality of metadata bits comprising information based on the first data portion and the second data portion, and a plurality of parity bits. The decode circuit is configured to determine whether the first data portion comprises a symbol error based on the plurality of ECC symbols, and in response to determining the first data portion comprises a symbol error, correct the symbol error. The decode circuit is configured to determine whether one of the second data portion and the plurality of metadata bits comprises a parity error based on the plurality of parity bits, and in response to determining one of the second data portion and the plurality of metadata bits comprises a parity error, generate a parity error indication.

In another exemplary aspect, a method of error recovery in a memory access operation is disclosed. The method comprises receiving, in a decode circuit of the memory control circuit, a codeword comprising a first data portion, a plurality of ECC symbols, a second data portion, a plurality of metadata bits comprising information related to the first data portion and the second data portion, and a plurality of parity bits. The method comprises determining whether the first data portion comprises a symbol error based on the plurality of ECC symbols and, in response to determining the first data portion comprises a symbol error, correcting the symbol error. The method comprises determining whether one of the second data portion and the plurality of metadata bits comprises a parity error based on the plurality of parity bits and, in response to determining one of the second data portions and the plurality of metadata bits comprises a parity error, generating an error indication.

In another exemplary aspect, a computer-readable medium comprising a memory module and a processor is provided. The processor comprises a memory control circuit configured to access data in the memory module in response to instructions from the processor. The memory control circuit comprises a decode circuit configured to receive a codeword comprising a first data portion, a plurality of ECC symbols, a second data portion, a plurality of metadata bits comprising information based on the first data portion and the second data portion, and a plurality of parity bits. The decode circuit is configured to determine whether the first data portion comprises a symbol error based on the plurality of ECC symbols and, in response to determining the first data portion comprises a symbol error, correct the symbol error. The decode circuit is configured to determine whether one of the second data portion and the plurality of metadata bits comprises a parity error based on the plurality of parity bits and, in response to determining one of the second data portions and the plurality of metadata bits comprises a parity error, generate an error indication.

In another exemplary aspect, a non-transitory computer-readable medium comprising instructions that, when executed by a processor, cause the processor to receive a codeword comprising a first data portion, a plurality of ECC symbols, a second data portion, a plurality of metadata bits comprising information based on the first data portion and the second data portion, and a plurality of parity bits is disclosed. The instructions cause the processor to determine whether the first data portion comprises a symbol error based on the plurality of ECC symbols and, in response to determining the first data portion comprises a symbol error, correct the symbol error. The instructions also cause the processor to determine whether one of the second data portion and the plurality of metadata bits comprises a parity error based on the plurality of parity bits and, in response to determining one of the second data portions and the plurality of metadata bits comprises a parity error, generate an error indication.

DETAILED DESCRIPTION

Figure 1:
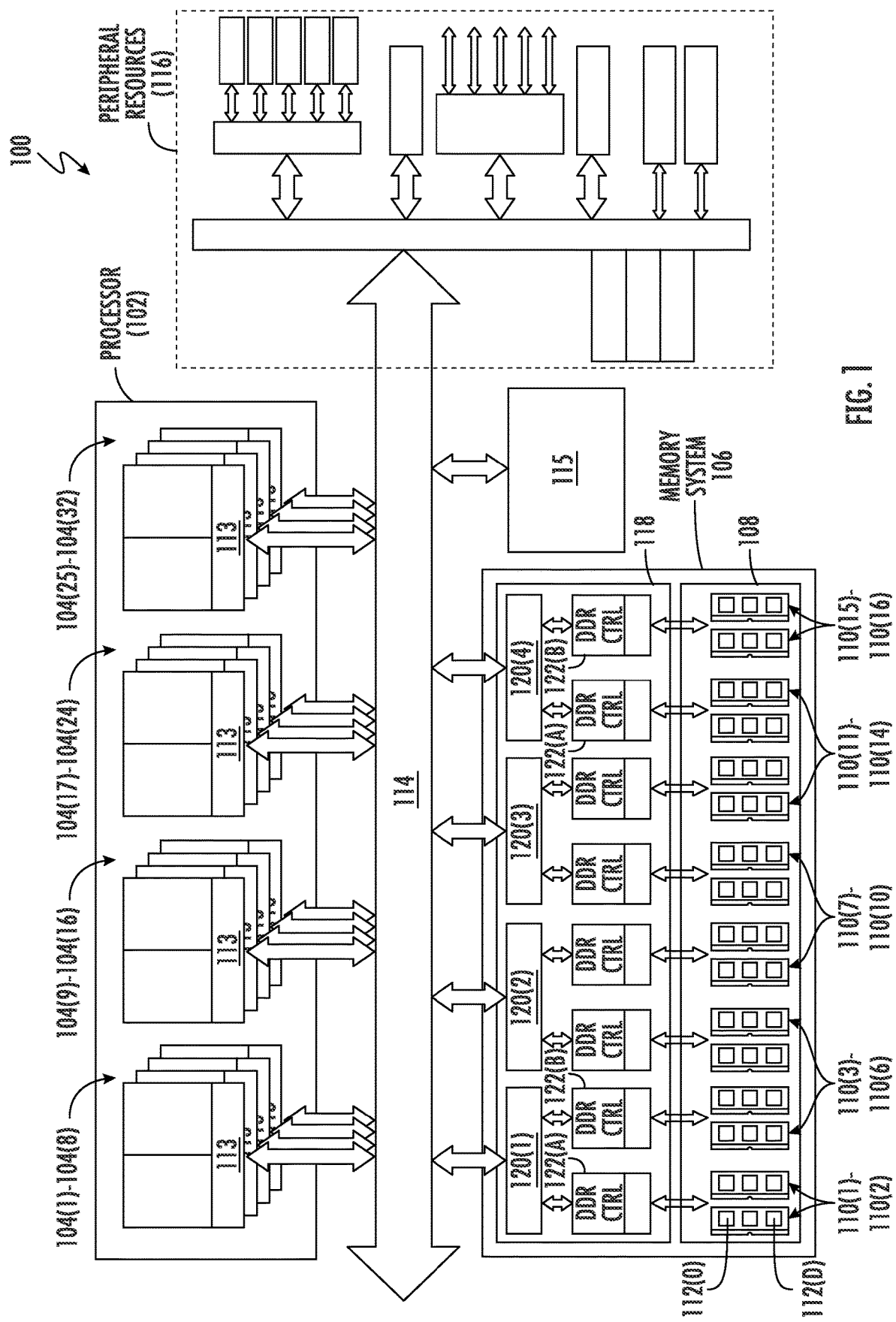
FIG. 1 is a block diagram of an exemplary computer system that includes a processor having a plurality of central processing unit (CPU) cores and peripheral devices, and other resources, including a memory system in which error correction codes (ECC) and parity are integrated in a memory control circuit to provide increased memory utilization.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include integrated error correction code (ECC) and parity in memory control circuits for increased memory utilization. Related methods of integrated error protection to increase memory utilization are also disclosed. A memory control circuit coupled to a memory module performs write access operations and read access operations. Each access operation transfers a plurality of codewords that each include multiple blocks of a specified number of bits. The number of blocks in each codeword corresponds to a number of memory chips in the memory module, and the memory module is configured to limit errors to one memory chip, which corresponds to one block in each codeword. The blocks that form a codeword include data blocks containing data stored into the memory module by a processor, for example, and supplemental blocks including ECC symbols for detecting and correcting errors in the data retrieved from the memory module. Utilization of the codeword can be increased by repurposing some of the bits of the ECC symbols in the supplemental blocks with metadata bits associated with the data in the data blocks. However, if some of the bits in the supplemental blocks are used for metadata, there are not enough bits available for the ECC symbols to protect all the data in the data blocks.

In an exemplary aspect, the supplemental blocks include the metadata bits, ECC symbols employed to protect a first data portion of the codeword divided among the data blocks, and parity bits configured to protect the metadata bits and a second data portion of the codeword divided among the data blocks. Errors in the first data portion can be located and corrected using the ECC symbols. The protection provided by the parity bits includes detecting error(s) in the second data portion. Parity bits alone, however, cannot identify a location of the detected error(s) and, therefore, cannot fix the parity errors. In examples disclosed herein, the first data portion of the data block is encoded using the second data portion of the data block to generate an encoded first data portion before the codeword is stored in the memory module in a write access operation to provide a way to locate and correct parity errors found in the second data portion. In a read access operation, the encoded first data portion in each block of the codeword is decoded using the second data portion of the corresponding data block. In this decoding process, any error in the encoded second data portion or the first data portion of a data block received from the memory module creates one or more errors in the decoded first data portion. The block in which the error(s) are located in the codeword can be identified, and the errors in the first data portion can be corrected using the ECC symbols. The parity bits are used to check for errors in the second data portion of the codeword. Because the ECC algorithm has identified the error location, it can be determined that any parity errors in the second data portion of the codeword are in the error location, and those parity errors can be corrected. In some examples, encoding the first data portion of each data block using the second data portion of the corresponding data block in a write access operation comprises the logic operation of exclusive-ORing (XORing) the first data portion with the second data portion to generate an encoded first data portion. Decoding the encoded first data portion in a read access operation comprises XORing the encoded first data portion of the codeword received from the memory module with the second data portion received from the memory module. Protecting a codeword by configuring the supplemental blocks and encoding the first data portion as described above allows some of the bits of the supplemental blocks to be repurposed as metadata bits to increase memory utilization while the level of error protection is maintained.

Figure 2:
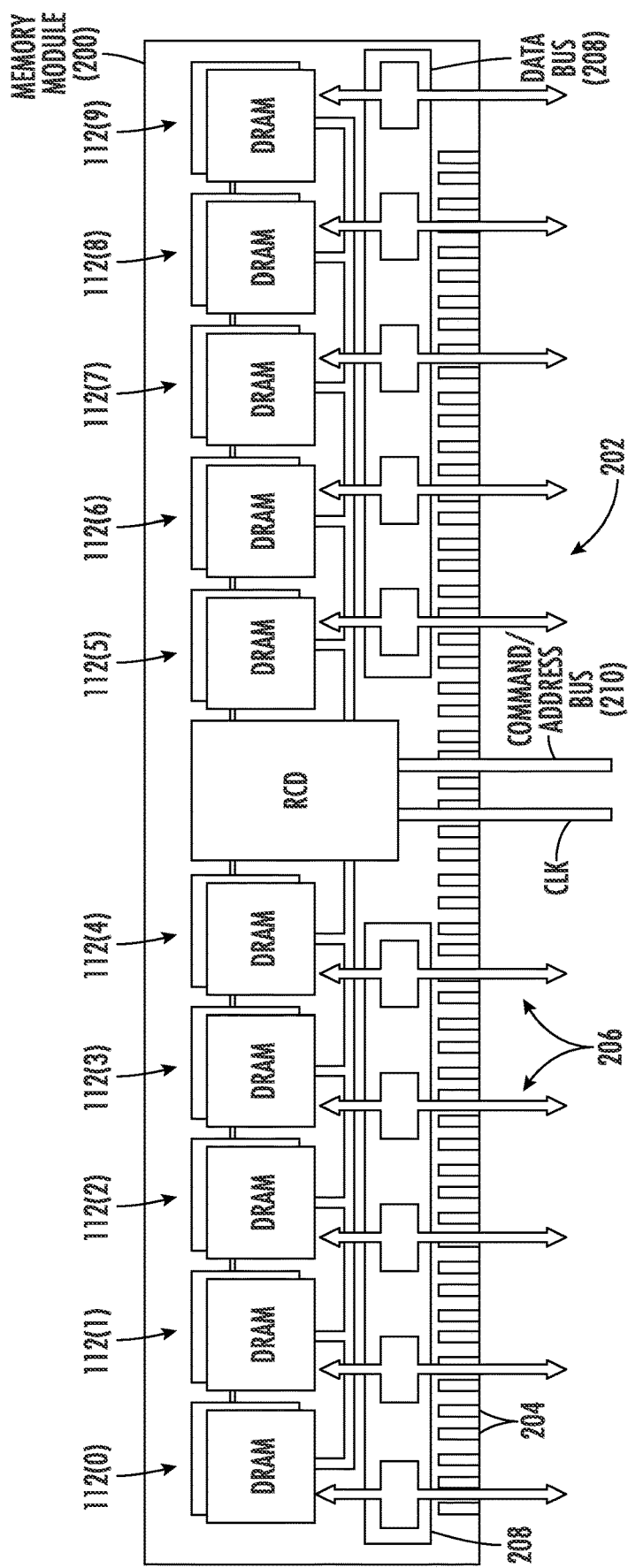
FIG. 2 is a block diagram of a memory module employed in the exemplary computer system in FIG. 1 and includes a plurality of memory chips controlled by the memory control circuit to perform write access operations and read access operations.
Figure 3B:
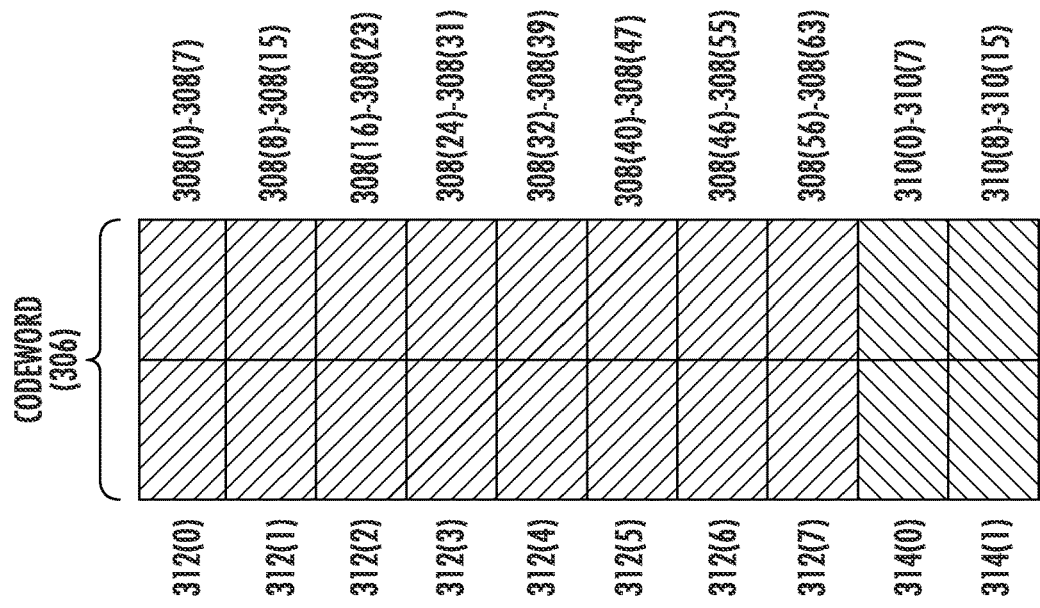
FIGS. 3A-3B are block diagrams illustrating the data structure of binary information, including codewords transferred between the memory control circuit and the memory module in a memory access operation.
Figure 3A:
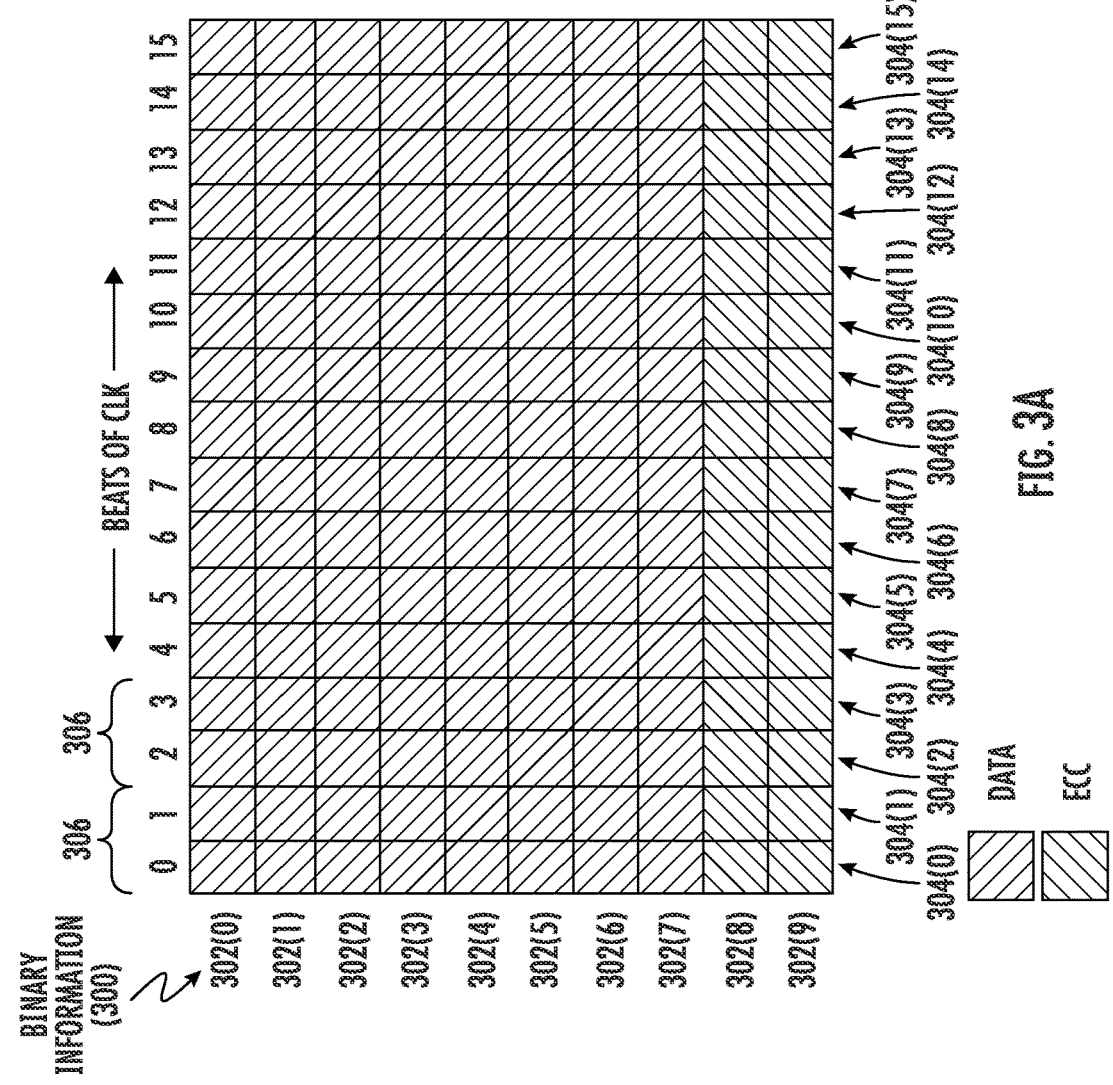

Before discussing an example of a codeword employed by an exemplary memory control circuit in FIG. 4, a computer system including the exemplary memory control circuit is first described with reference to FIG. 1. FIG. 2 is provided to illustrate a memory module comprising a standardized memory interface that may be employed in the computer system in FIG. 1 or a system comprising a conventional memory control circuit. FIGS. 3A and 3B are provided to illustrate a format of a codeword transferred between a conventional memory control circuit and the memory module in FIG. 2 for purposes of comparison to aspects disclosed herein.

In this regard, FIG. 1 is a block diagram of an exemplary computer system 100 that includes a processor 102 that includes a plurality of central processing unit (CPU) cores 104(1)-104(C) and a memory system 106 for storing data to be accessed by the CPU cores 104(1)-104(C). For example, there may be thirty-two (32) CPU cores 104(1)-104(32) in the processor 102, where 'C' is thirty-two (32). As discussed in more detail below, the memory system 106 integrates ECC and parity to increase memory utilization of the main memory 108 without reducing error protection in the memory system 106. For example, the main memory 108 may include a series of memory modules 110(1)-110(M) that each includes memory chips 112(0)-112(D) (e.g., DRAM memory chips). For example, there may be sixteen memory modules 110(1)-110(16) in the main memory 108, wherein 'M' is sixteen (16), and each of the memory modules 110(1)-110(16) may include ten (10) memory chips, where 'D' is nine (9). The computer system 100 includes a cache memory hierarchy that stores data for quick access to the CPU cores 104(1)-104(C). Pairs of the CPU cores 104(1)-104(C) each share a private level 2 cache memory 113 as part of the cache memory hierarchy. For example, for a memory write access operation, a CPU core 104(1)-104(C) can write data to its private, shared level 2 cache memory 113. A cache entry evicted from the level 2 cache memory 113 to make room for new write data is communicated over a coherent fabric bus 114 to be written to a system level 3 cache memory 115. The processor 102 also uses the coherent fabric bus 114 to connect to other external peripheral resources 116. Requests from the processor 102 are communicated over the coherent fabric bus 114 to the destination resource to service such requests. A cache entry evicted from the level 3 cache memory 115 to make room for the new write data in the level 3 cache memory 115 is communicated over the coherent fabric bus 114 to be written to the main memory 108 in the memory system 106.

With continuing reference to FIG. 1, the memory system 106 includes the main memory 108 and a memory controller unit (MCU) system 118 employed to access the main memory 108. The MCU system 118 includes memory control subsystems (MCSs) 120(1)-120(N), wherein 'N' may be four (4) and each MCS 120(1)-120(4) includes interfaces to two (2) memory control circuits 122(A) and 122(B). The memory control circuits 122(A)-122(B) are double-data rate (DDR) controllers DDR_CTRL in this example. Each DDR controller DDR_CTRL is dedicated to controlling a respective pair of the memory modules 110(1)-110(16) to perform a memory access operation. The DDR controllers DDR_CTRL each provide a physical interface (PHY) between the memory control subsystems (MCS) 120(1)-120(4) and the respective memory modules 110(1)-110(16).

FIG. 2 is a block diagram illustrating a memory module 200 corresponding to the memory modules 110(1)-110(8) employed in the processor 102 in FIG. 1. The memory module 200 includes the plurality of memory chips 112(0)-112(9) (e.g., DRAM memory devices) configured to be coupled to a DDR controller DDR_CTRL over a memory interface 202. The memory chips 112(0)-112(9) store data written to memory by one of the CPU cores 104(1)-104(C) in FIG. 1 (which, in an aspect, may be data evicted from the level 3 cache 115 in FIG. 1). The memory module 200, including the memory interface 202, is an example of a memory module that is compliant with JEDEC standards (e.g., DDR5 JEDEC Specification JESD79-4 with a Bounded Fault functionality) and may be employed in the processor 102 of FIG. 1 to implement exemplary aspects disclosed herein. The memory interface 202 couples to pins 204 of the memory module 200 for transferring binary information 206 to or from the memory module 200. A specified number "P" (e.g., four) of the pins 204 are coupled to each of the plurality of memory chips 112(0)-112(D) to form a data bus 208 having Px(D+1) (e.g., forty (40)) of the pins 204 through which the binary information 206 is transferred in a memory access operation. In compliance with the DDR5 JEDEC Specification JESD79-4 with Bounded Fault functionality, the binary information 206 transferred on the data bus 208 in a memory read access operation is limited to the P pins 204 of just one of the memory chips 112(0)-112(D) and the binary information. Commands for initiating memory access operations and the memory addresses to be accessed in a memory access operation are provided by the DDR controller DDR_CTRL over a command/address bus 210. The memory interface 202 also includes a clock signal CLK to synchronize transfers over the data bus 208 and the command/address bus 210.

FIG. 3A is a diagram illustrating binary information 300 transferred between a memory module (e.g., the memory module 200 in FIG. 2) and a conventional memory control circuit in a memory access operation. Each one of the rows 302(0)-302(9) of the binary information 300 represents four (4) bits (e.g., a "nibble") transferred to or from one of the memory chips 112(0)-112(9). Each one of columns 304(0)-304(15) represents a data transfer of forty (40) bits in parallel to or from the memory chips 112(0)-112(9) in synchronization with a "beat" of the clock signal CLK, where a beat is a rising or falling edge (i.e., a voltage transition) of the clock signal CLK. Thus, the binary information 300 is transferred in sixteen (16) beats of the clock signal CLK. The binary information 300 is organized as eight (8) codewords 306, shown in FIG. 3B, each transferred in two (2) beats of the clock signal CLK, where each codeword 306 includes data bits 308(0)-308(63) and ECC bits 310(0)-310(15).

With further reference to FIG. 3B, the data bits 308(0)-308(63) are arranged in data symbols 312(0)-312(7) as follows. Data symbol 312(0) includes the data bits 308(0)-308(3) received from the memory chip 112(0) in a first beat of the clock signal CLK and the data bits 308(4)-308(7) received in a second beat of the clock signal CLK. Data symbol 312(1) includes the data bits 308(8)-308(11) received from the memory chip 112(1) in the first beat of the clock signal CLK and the data bits 308(12)-308(15) received in the second beat of the clock signal CLK. And so on, through the data symbol 312(7), which includes the data bits 308(56)-308(59) received from the memory chip 112(7) in the first beat of the clock signal CLK and data bits 308(60)-308(63) received in the second beat of the clock signal CLK.

For example, the data symbols 312(0)-312(7) may correspond to data sent to a memory controller by a processor with a memory write instruction and a memory address for storage into a memory module. The ECC bits 310(0)-310(15) are arranged in ECC symbols 314(0)-314(1). The ECC symbols 314(0)-314(1) are also transferred in the first and second beats of the clock signal CLK. The ECC symbol 314(0) includes the ECC bits 315(0)-315(3) and the ECC bits 315(4)-315(7) received from the memory chip 112(8) in the first and second beats, respectively, of the clock signal CLK. The ECC symbol 314(1) includes the ECC bits 315(8)-315(11) and the ECC bits 315(12)-315(15) received from the memory chip 112(9) in the first and second beats, respectively, of the clock signal CLK. The ECC bits 310(0)-310(15) are generated by an ECC algorithm (e.g., RS algorithm) based on the data bits 308(60)-308(63) and are transferred to the memory module for storage at the memory address. When the memory controller subsequently receives a memory read instruction directed to the memory address at which the data symbols 312(0)-312(7) are stored, the data symbols 312(0)-312(7) and the ECC symbols 314(0)-314(1) are transferred back as the codeword 306 to the memory controller in the same format as used in the memory write operation.

To protect against errors in the data stored in a memory module, which may be caused by high energy particles, noise, or degradation of the memory chips 112(0)-112(9), for example, a corresponding ECC algorithm is employed to check for and correct errors in any one of the data symbols 312(0)-312(7). The ECC symbols 314(0)-314(1) can be used to identify and correct multiple errors in a single one of the data symbols 312(0)-312(7). That is, the ECC bits 310(0)-310(15) (i.e., 16 bits) can be used to detect and correct errors in one of the data symbols 312(0)-312(7) (i.e., 8 bits). In other words, the ECC algorithm can detect and correct errors in any of the eight data bits (e.g., 308(0)-308(7)) of any one of the data symbols 312(0)-312(7) using all sixteen of the ECC bits 310(0)-310(15), which is a 2-to-1 ratio of ECC bits to protected data bits. The ECC symbols 314(0)-314(1) are not used to correct errors that occur in two or more of the data symbols 312(0)-312(7) in the same transfer. To complete the memory read operation, the memory controller corrects errors in the data symbols 312(0)-312(7), if any, and returns all of the data bits 308(0)-308(63) to the processor. The ECC bits 310(0)-310(15) may not be returned to the processor.

In the example shown in FIG. 3B, storing the ECC bits 310(0)-310(15) with the data bits 308(60)-308(63) in the memory module occupies 80 bits of the memory module 200. Twenty percent (20%) of the memory module 200 is utilized for storing the ECC symbols 314(0)-314(1), which are used only for protection against errors occurring in the memory module. Increasing the memory utilization of the memory module means increasing the percentage of memory circuits storing protected data (e.g., data to be used by a processor) and reducing the percentage of memory circuits used for error protection alone. Increasing memory utilization increases storage efficiency and can reduce device costs by reducing a number of memory circuits needed to store a given amount of information. However, it is desirable to maintain a high level of protection against errors occurring in the memory module for system reliability.

Figure 4:
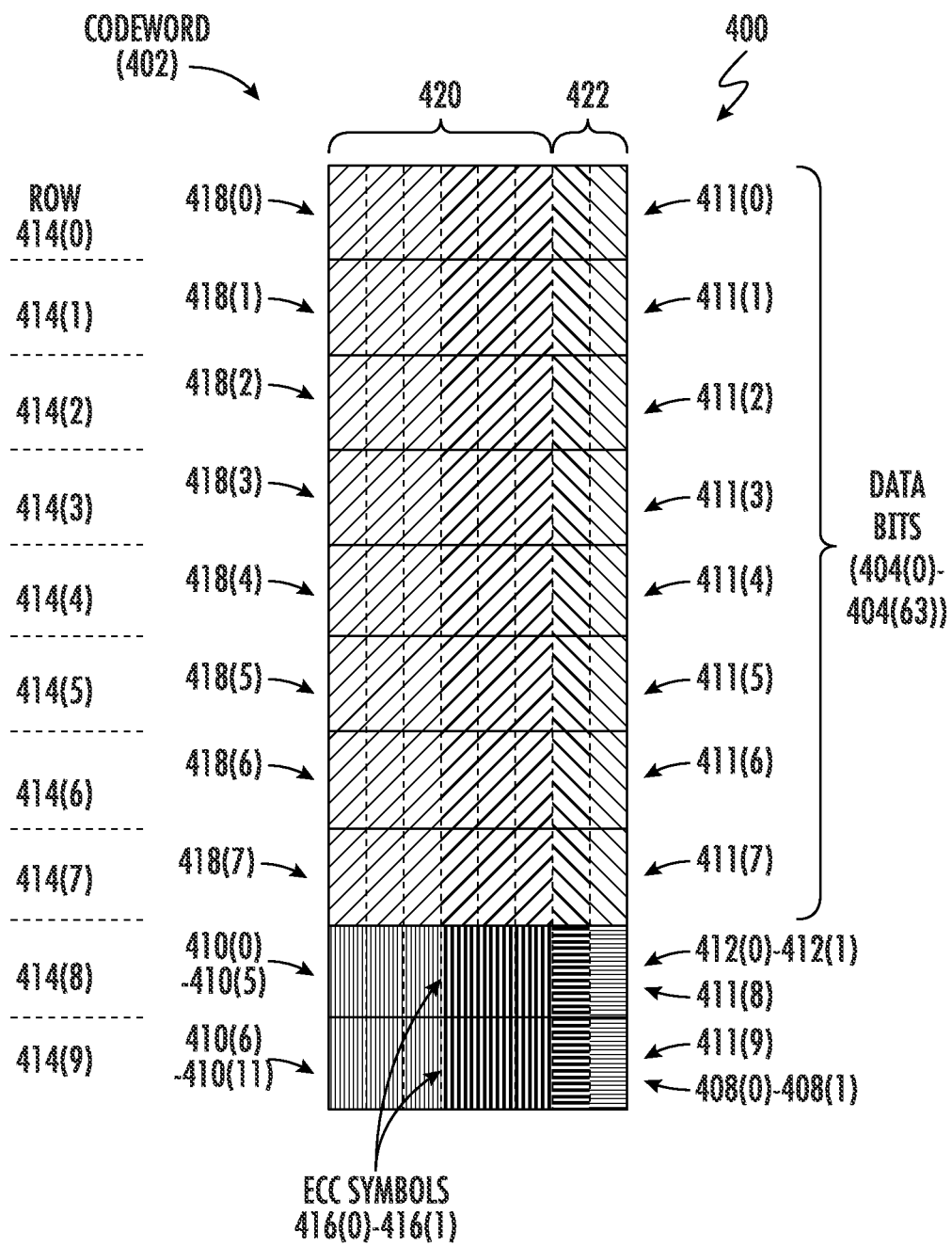
FIG. 4 is a diagram illustrating exemplary codewords transferred in a memory access operation in a memory system in which metadata bits in each codeword increase memory utilization, and the integration of ECC protection and parity protection are used to maintain a level of error protection.

FIG. 4 is an illustration of a first format 400 of a codeword 402 employed in memory access operations by the exemplary memory control circuits 122(A)-122(B) in FIG. 1. The codeword 402 includes eighty (80) bits, like the codeword 306 in FIG. 3. The codeword 402 includes data bits 404(0)-404(63) (i.e., 64 bits). The remaining sixteen (16) bits of the codeword 402 differ from the codeword 306 in FIG. 3. Two bits that were previously used for error protection (e.g., ECC bits 310(14)-310(15)) are repurposed as metadata bits 408(0)-408(1) that provide information about the data bits 404(0)-404(63). The metadata bits 408(0)-408(1) and the data bits 404(0)-404(63) are provided to the memory control circuit by the processor in a memory write operation for storage. In this manner, the codeword 402 is used to increase utilization of the memory module 200 in FIG. 2. In addition to the data bits 404(0)-404(63) and the metadata bits 408(0)-408(1), the codeword 402 includes symbol bits 410(0)-410(11) and parity bits 412(0)-412(1). The metadata bits 408(0)-408(1) allow the codeword 402 to hold more data than the codeword 306. The metadata bits 408(0)-408(1) are information associated with the data bits 404(0)-404(63). One example of the metadata bits 408(0)-408(1) is as tag bits to provide addressing or classification information about the data bits 404(0)-404(63). The data bits 404(0)-404(63) are arranged in rows 414(0)-414(7) of the codeword 402. As explained below, the symbol bits 410(0)-410(5) and parity bits 412(0)-412(1) are generated based on the data bits 404(0)-404(63) and the metadata bits 408(0)-408(1). The symbol bits 410(0)-410(5) and parity bits 412(0)-412(1) are arranged in row 414(8) of the codeword 402. The symbol bits 410(6)-410(11) and the metadata bits 408(0)-408(1) are arranged in row 414(9) of the codeword 402.

Based on the ECC algorithm (described above with regard to FIG. 3), having a 2-to-1 ratio of ECC bits to protected data bits, replacing two bits previously included in the ECC symbols 416 with the metadata bits 408(0)-408(1) leaves an insufficient number of bits remaining in the codeword 402 for providing the same level of error protection in the rows 414(0)-414(7). In an alternative approach disclosed herein, the symbol bits 410(0)-410(11) are arranged as ECC symbols 416(0)-416(1), each having six (6) bits. The ECC symbol 416(0) includes symbol bits 410(0)-410(5), and the ECC symbol 416(1) includes symbol bits 410(6)-410(11). These six-bit ECC symbols 416(0)-416(1) are employed by an ECC algorithm to protect data symbols 418(0)-418(7), which each have six (6) bits. The data symbols 418(0)-418(7) are formed from the six of the data bits 404(0)-404(63) in each of the rows 414(0)-414(7), respectively.

Specifically, the data symbol 418(0) includes data bits 404(0)-404(5) in row 414(0), data symbol 418(1) includes data bits 404(8)-404(13) in row 414(1), data symbol 418(2) includes data bits 404(16)-404(21) in row 414(2), data symbol 418(3) includes data bits 404(24)-404(29) in row 414(3), data symbol 418(4) includes data bits 404(32)-404(37) in row 414(4), data symbol 418(5) includes data bits 404(40)-404(45) in row 414(5), data symbol 418(6) includes data bits 404(48)-404(53) in row 414(6), and data symbol 418(7) includes data bits 404(56)-404(61) in row 414(7). The data symbols 418(0)-418(7) form a first data portion 420 of the codeword 402. The ECC symbols 416(0)-416(1) are generated by an ECC algorithm based on the first data portion 420 (i.e., the data symbols 418(0)-418(7)) as an input. A corresponding ECC algorithm can use the ECC symbols 416(0)-416(1) to detect, locate, and correct errors in one of the data symbols 418(0)-418(7)) in the first data portion 420.

The two bits in each of the rows 414(0)-414(7) that are not included in the first data portion 420 are referred to herein as bit pairs 411(0)-411(7) and the bit pairs 411(0)-411(7) collectively form a second data portion 422 of the codeword 402. Specifically, the second data portion 422 includes the bit pair 411(0) including the data bits 404(6)-404(7) in row 414(0), bit pair 411(1) including the data bits 404(14)-404(15) in row 414(1), bit pair 411(2) including the data bits 404(22)-404(23) in row 414(2), bit pair 411(3) including the data bits 404(30)-404(31) in row 414(3), bit pair 411(4) including the data bits 404(38)-404(39) in row 414(4), bit pair 411(5) including the data bits 404(46)-404(47) in row 414(5), bit pair 411(6) including the data bits 404(54)-404(55) in row 414(6), and bit pair 411(7) including the data bits 404(62)-404(63) in row 414(7). The parity bits 412(0)-412(1) are also referred to as a bit pair 411(8), and the metadata bits 408(0)-408(1) are referred to as bit pair 411(9).

The parity bits 412(0)-412(1) are generated by a parity generation algorithm based on the second data portion 422 (i.e., the bit pairs 411(0)-411(7)). Errors in the second data portion 422 can be detected with a parity checking algorithm using the parity bits 412(0)-412(1). However, locating the one of the rows 414(0)-414(7) containing a parity error is not possible based on the parity bits 412(0)-412(1) alone. To provide error location capability for the second data portion 422, so the error(s) can be corrected, the first data portion 420 is merged with the second data portion 422 before being transferred to the memory module and written into the memory module, as explained below. Similarly, the ECC symbols 416(0)-416(1) are merged with the parity bits 412(0)-412(1) and the metadata bits 408(0)-408(1) before being stored in the memory module. The codeword 402 may or may not actually be assembled in memory in the first format 400 shown in FIG. 4, but the above description of codeword 402 and features thereof is beneficial to an understanding of a second format 500 of a codeword 502 in FIG. 5.

Figure 5:
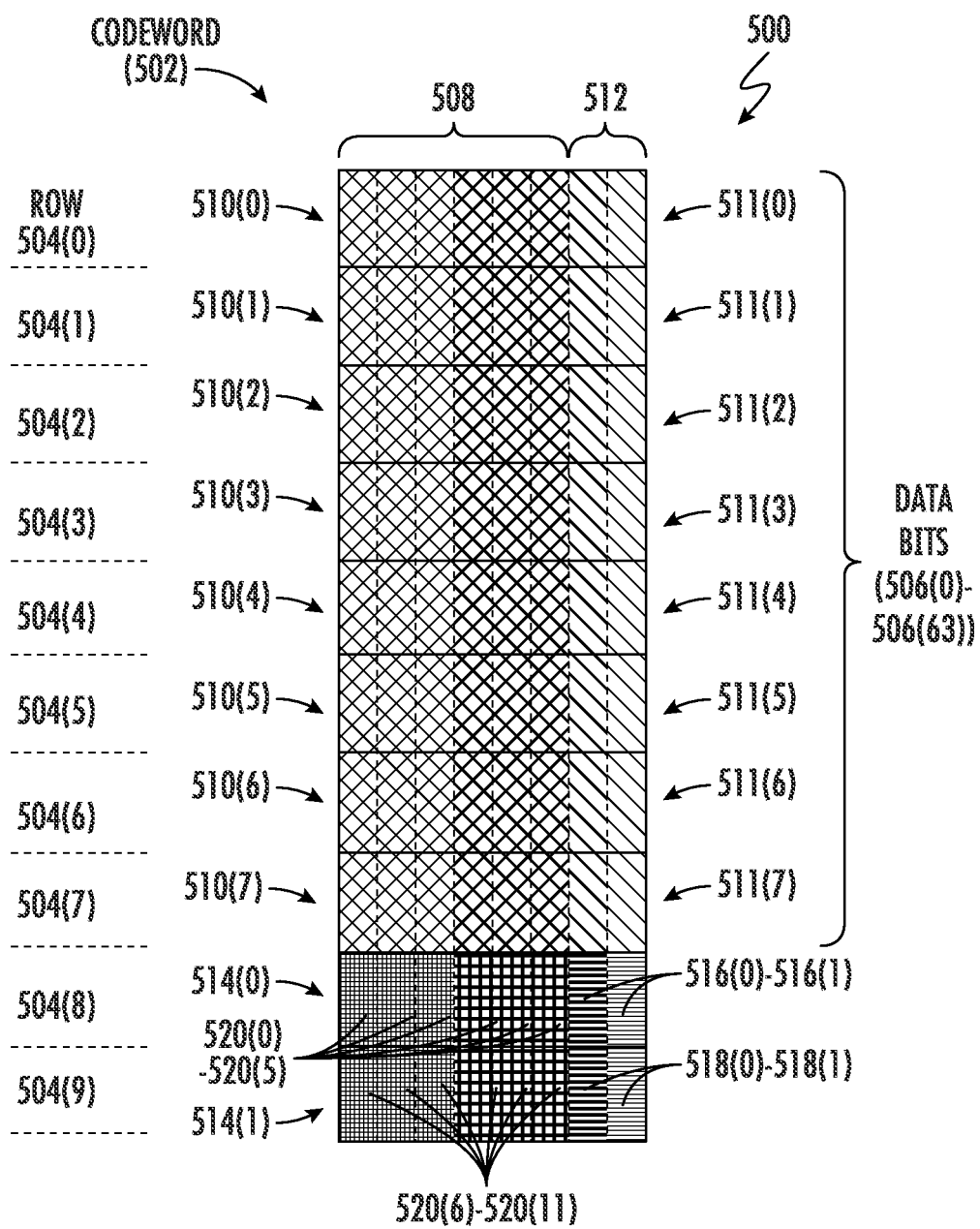
FIG. 5 is a block diagram illustrating encoding codewords stored in a memory module in a memory access operation in which a first data portion of each data block is encoded with a second data portion of the data block to integrate ECC protection and parity protection.

FIG. 5 is an illustration of the codeword 502 showing the second format 500, which is employed for transfers to and from a memory module in memory access operations by the exemplary memory control circuits 122(A)-122(B) in FIG. 1. The organization of the codeword 502 corresponds to the codeword 402. Thus, the components of FIG. 5 are described with further reference to FIG. 4, and features of the codeword 502 that remain unchanged from codeword 402 retain their original numbering from FIG. 4 in FIG. 5.

Codeword 502 includes rows 504(0)-504(9). Data bits 506(0)-506(63) are divided equally (e.g., eight data bits each) among the rows 504(0)-504(7). A merged first data portion 508 includes merged data symbols 510(0)-510(7). The merged data symbols 510(0)-510(7) each include six bits of the corresponding rows 504(0)-504(7) (e.g., data bits 506(0)-506(5) in row 504(0)). The codeword 502 also includes bit pairs 511(0)-511(7) to form a second data portion 512. The bit pairs 511(0)-511(7) include the two bits in each of the rows 504(0)-504(7) that are not in the merged data symbols 510(0)-510(7) (e.g., data bits 506(6)-506(7) in row 504(0)). Rows 504(8) includes merged ECC symbol 514(0) and parity bits 516(0) and 516(1). Row 504(9) includes a merged ECC symbol 514(1) the metadata bits 518(0) and 518(1). The parity bits 412(0)-412(1) and the metadata bits 408(0)-408(1) in the codeword 402 are unchanged by the transformation to codeword 502 and are relabeled in FIG. 5 as the parity bits 516(0) and 516(1) and the metadata bits 518(0) and 518(1), respectively. The parity bits 516(0) and 516(1) and the metadata bits 518(0) and 518(1) correspond in position to the bit pairs 511(0)-511(7) in rows 504(0)-504(7). Thus, the parity bits 516(0) and 516(1) are referred to as bit pair 511(8) in row 504(8), and the metadata bits 518(0) and 518(1) are referred to as bit pair 511(9) in row 504(9). The parity bits 516(0) and 516(1) are used to detect errors in the metadata bits 518(0) and 518(1) and the second data portion 512.

Referring back briefly to the description of codeword 402 above, error detection and correction are possible in the first data portion 420 in the codeword 402. Specifically, one or more errors in one of the data symbols 418(0)-418(7) in rows 414(0)-414(7) can be detected and located (i.e., the row can be identified) by an ECC algorithm using the ECC symbols 416(0)-416(1) and the located errors can be corrected. A parity error in the second data portion 422 can be detected but cannot be located by the parity bits 412(0)-412(1) and, therefore, cannot be corrected. However, by taking advantage of the capabilities of the first data portion 420, errors in the second data portion 422 can be located and corrected using the codeword 502.

There are eight data bits of bits 506(0)-506(63) in each of the rows 504(0)-504(7). Details regarding the rows 504(1)-504(7) can be understood in view of the following explanation regarding row 504(0). The row 504(0) includes the data bits 506(0)-506(7). Data bits 506(0)-506(5) make up the merged data symbol 510(0), which is included in the merged first data portion 508. Error protection of the merged data symbol 510(0) is possible using the merged ECC symbols 514(0) and 514(1). On the other hand, the bit pair 511(0) in the row 504(0) is included in the second data portion 512, which is protected (i.e., by error detection only) by the parity bits 412(0)-412(1). In an exemplary aspect, the transition from codeword 402 to codeword 502 includes creating the merged first data portion 508 by merging the first data portion 420 of codeword 402 with the second data portion 422 of codeword 402 and the second data portion 422 of codeword 402 becomes the second data portion 512 in codeword 502. To generate row 504(0), for example, the data bits 404(6) and 404(7) are merged with the data bits 404(0)-404(5) to generate the data bits 506(0)-506(5), and the data bits 404(6) and 404(7) remain unchanged to become the data bits 506(6) and 506(7). In another example, to generate the data bits 506(56)-506(63), the data bits 404(62) and 404(63) are merged with the data bits 404(56)-404(61) to generate the data bits 506(56)-506(61), and the data bits 404(62) and 404(63) remain unchanged to become the data bits 506(62) and 506(63).

In further detail, merging the data bits 404(6) and 404(7) with the data bits 404(0)-404(5) to generate the data bits 506(0)-506(5) includes generating the exclusive-OR ("XORing") of the data bit 404(6) with each of the data bits 404(0), 404(1), and 404(2) or with each of the data bits 404(3), 404(4), and 404(5) and XORing the data bit 404(7) with each of the data bits 404(3), 404(4), and 404(5) or with each of the data bits 404(0), 404(1), and 404(2). In this regard, in one example, the data bits 506(0)-506(2) are based on the data bits 404(0)-404(2) and the data bit 404(7), and the data bits 506(3)-506(5) are based on the data bits 404(3)-404(5) and the data bit 404(6).

Similarly, merging the data bits 404(62) and 404(63) with the data bits 404(56)-404(61) to generate the data bits 506(56)-506(61) includes XORing the data bit 404(62) with each of the data bits 404(56), 404(57), and 404(58) or with each of the data bits 404(59), 404(60), and 404(61) and XORing the data bit 404(63) with each of the data bits 404(59), 404(60), and 404(61) or with each of the data bits 404(56), 404(57), and 404(58).

The following equations are one example of a method for generating the data bits 506(0)-506(7) in the row 504(0) from the data bits 404(0)-404(7) in the row 414(0). The '^' character in the following equations indicates an XOR operation.

$$506(0) = 404(0) \wedge 404(7);$$

$$506(1) = 404(1) \wedge 404(7);$$

$$506(2) = 404(2) \wedge 404(7);$$

$$506(3) = 404(3) \wedge 404(6);$$

$$506(4) = 404(4) \wedge 404(6);$$

$$506(5) = 404(5) \wedge 404(6);$$

$$506(6) = 404(6); \text{ and}$$

$$506(7) = 404(7).$$

The above-described merging is performed in each of the rows 504(0)-504(7).

The second data portion 512 of the codeword 502 is unchanged from the second data portion 422 of the codeword 402, but the merged first data portion 508 of the codeword 502 is a result of merging (XORing as described above) the first data portion 420 and the second data portion 422. Stated differently, the merged data symbols 510(0)-510(7) are generated by merging the data symbols 418(0)-418(7) with data bits of the second data portion 422 in each of the rows 414(0)-414(7).

Similarly, the above-described merging is performed in each of the rows 504(0)-504(7). The merged ECC symbols 514(0)-514(1) are generated by merging the ECC symbols 416(0)-416(1) with the parity bits 412(0)-412(1) and the metadata bits 408(0)-408(1), respectively. In rows 504(8), one of the parity bits 412(0)-412(1) (e.g., 412(1)) is merged (XORed) with each of the symbol bits 410(0)-410(2) to generate first symbol bits 520(0)-520(2) of the merged ECC symbol 514(0). The other one of the parity bits 412(0)-412(1) (e.g., 412(0)) is merged with each of symbol bits 410(3)-410(5) to generate second symbol bits 520(3)-520(5) in the merged ECC symbol 514(0). In row 504(9), one of the metadata bits 408(0)-408(1) (e.g., 408(1)) is merged with each of symbol bits 410(6)-410(8) to generate first symbol bits 520(6)-520(8) in the merged ECC symbol 514(1) and the other one of the metadata bits 408(0)-408(1) (e.g., 408(0)) is merged with each of symbol bits 410(9)-410(11) to generate first symbol bits 520(9)-520(11) in the merged ECC symbol 514(1).

To complete a memory write operation after transforming the codeword 402 from the first format 400 shown in FIG. 4 to the codeword 502 in the second format 500 shown in FIG. 5, the memory control circuits transfer the rows 504(0)-504(9) of the codeword 502 to be stored in the memory chips of the memory module at the memory address provided in the memory write instruction.

Subsequently, in response to a memory read instruction directed to the address at which the codeword 502 was previously stored, the codeword 502 is transferred back from the memory module to the memory control circuits. The codeword 502 is transformed from the second format 500 back to the first format 400 shown in FIG. 4. Since the first format 400 is shown in FIG. 4, no separate illustration is provided to show a format of the codeword 502 after it has been transformed back to the first format 400. The codeword 502 is transformed to restore the data bits 406(0)-406(63) for use by the processor that issued the memory read instruction. In addition, the data bits 406(0)-406(63) need to be checked for errors. The parity bits 516(0)-516(1) can be used to determine whether one of the second data portion 512 and the metadata bits 518(0)-518(1) has an error. However, the merged first data portion 508 and the merged ECC symbols 514(0)-514(1) cannot be checked for errors until they are restored to the first format 400 in FIG. 4.

Transforming the codeword 502 in this regard involves demerging the merged first data portion 508 based on the second data portion 512 to generate a restored first data portion 420-R including restored data symbols 418-R(0)-418-R(7), which are not shown but correspond to the data symbols 418(0)-418(7) in FIG. 4. Demerging the first data portion 508 includes demerging the merged data symbols 510(0)-510(7) based on the corresponding bit pairs 511(0)-511(7) to generate the restored data symbols 418-R(0)-418-R(7). Each of the merged data symbols 510(1)-510(7) are demerged in a manner corresponding to demerging the merged data symbols 510(0), which includes XORing the data bits 506(0)-506(5) with the two data bits 506(6)-506(7) of the corresponding bit pair 511(0). Specifically, the merged data symbol 510(0) includes first data bits 506(0)-506(2) and second data bits 506(3)-506(5). The first data bits 506(0)-506(2) are XORed with the first one of the two data bits 506(6)-506(7) of the corresponding bit pair 511(0) (i.e., 506(7)) and second data bits 506(3)-506(5) are XORed with the second one of the two data bits 506(6)-506(7) of the corresponding bit pair 511(0) (i.e., 506(6)). As an alternative, the first data bits 506(0)-506(2) may be XORed with the data bit 506(7), and the second data bits 506(3)-506(5) may be XORed data bit 506(6).

Transforming the codeword 502 in the second format 500 back to the first format 400 also includes demerging the merged ECC symbols 514(0)-514(1) based on the parity bits 516(0)-516(1) and the metadata bits 518(0)-518(1) to generate restored ECC symbols 416-R(0)-416-R(1), which are not shown but correspond to the ECC symbols 416(0)-416(1) in FIG. 4. The ECC symbols 416-R(0)-416-R(1) are, in the absence of any errors, the same as the ECC symbols 416(0)-416(1) of the codeword 402 in FIG. 4. Demerging the merged ECC symbols 514(0)-514(1) includes XORing the merged ECC symbols 514(0)-514(1) with the parity bits 516(0)-516(1) and the metadata bits 518(0)-518(1). More particularly, the merged ECC symbol 514(0) includes first symbol bits 520(0)-520(2) and second symbol bits 520(3)-520(5), and the merged ECC symbol 514(1) includes the first symbol bits 520(6)-520(8) and the second symbol bits 520(9)-520(11). Demerging the merged ECC symbol 514(0) based on the parity bits 516(0)-516(1) includes XORing each of the first symbol bits 520(0)-520(2) of the first merged ECC symbol 514(0) with the first one of the plurality of parity bits 516(0)-516(1) (e.g., 516(1)) and XORing each of the second symbol bits 520(3)-520(5) of the first merged ECC symbol 514(0) with the second one of the plurality of parity bits 516(0)-516(1) (e.g., 516(0)) to generate the first restored ECC symbol 416-R(0). Demerging the second merged ECC symbol 514(1) based on the metadata bits 518(0)-518(1) includes XORing each of the first symbol bits 520(6)-520(8) of the second merged ECC symbol 514(1) with the first one of the plurality of metadata bits 518(0)-518(1) (e.g., 518(1)) and XORing each of the second symbol bits 520(9)-520(11) of the second merged ECC symbol 514(1) with the second one of the plurality of metadata bits 518(0)-518(1) (e.g., 518(0)) to generate the second restored ECC symbol 416-R(1) of the plurality of restored ECC symbols.

As a result of the above transformation (e.g., by demerging), the data bits 506(0)-506(63) of FIG. 5 have been transformed back to the data bits 404(0)-404(63) of the first format 400 of the codeword 402 unless errors have occurred in the memory module. Errors result when the value(s) of one or more of the data bits 506(0)-506(63) are "flipped" while being written into, stored in, or read from the memory module. In binary logic, a flipped bit is a bit whose value changed due to a high energy particle, electrical noise, a defective memory circuit, etc. In binary data, a flipped bit refers to a bit that has changed from a voltage indicating a "1" to a voltage indicating a "0" or vice versa.

Since the codeword 502 has been transformed and is restored to the first format 400, the following description of error detection and recovery refers to the features of FIG. 4 and the restored features discussed with regard to FIG. 5.

The memory control circuit determines whether the first data portion 420 includes one or more errors. In this case, the errors are referred to as symbol errors because the errors are in the data symbols 418(0)-418(7), and the determination is based on the restored ECC symbols 416(0)-416(1). An ECC algorithm (e.g., RS algorithm) takes the data symbols 418(0)-418(7) and the ECC symbols 416(0)-416(1) as inputs. The ECC algorithm implemented by the memory control circuit can be used to detect symbol errors. In response to determining the restored first data portion 420-R includes a symbol error, the ECC algorithm can be used to identify a location of a symbol error, which includes determining which one of the data symbols 418(0)-418(7) contains the symbol error(s). The ECC algorithm can also be used to correct the symbol errors, which can include regenerating the eight of the data bits 406(0)-406(63) in the one of the data symbols 418(0)-418(7) containing the error(s). The data symbols 418(0)-418(7) correspond to the rows 414(0)-414(7). Thus, identifying a location of the symbol error may also include identifying one of the rows 414(0)-414(7). The ECC algorithm may also determine that the symbol errors are in one of the ECC symbols 416(0)-416(1).

The memory control circuit also determines whether one of the second data portion 422 and the metadata bits 408(0)-408(1) contains an error based on the parity bits 412(0)-412(1). A parity checking algorithm, such as an XOR operation, takes the second data portion 422, the metadata bits 408(0)-408(1), and the parity bits 412(0)-412(1) as inputs and can determine whether a parity error exists in either the second data portion 422 or the metadata bits 408(0)-408(1) based on the parity bits 412(0)-412(1). In response to determining one of the second data portion 422 or the metadata bits 408(0)-408(1) contains an error, the memory control circuit generates a parity error indication.

However, the parity check algorithm cannot determine a location of the parity error. In other words, the parity checking algorithm cannot detect whether an error is in one of the rows 414(0)-414(7) (i.e., in the bit pairs 411(0)-411(7)) or in the metadata bits 408(0)-408(1) in row 414(9). In order to maintain a same level of error protection (i.e., error correction for all bits from a particular one of the memory chips, as described with regard to FIG. 3, the memory control circuit needs to be able to locate the parity errors detected in either the bit pairs 411(0)-411(7) or the metadata bits 408(0)-408(1), so those errors can also be corrected. The following examples are presented to describe how such error protection is provided.

First, in the example of a single bit error, the single bit error may occur in any of the merged first data portion 508, the second data portion 512, or the metadata bits 518(0)-518(1) in the codeword 502 transferred back from the memory module. If the error occurred in the merged first data portion 508, there will be an error in the restored first data portion 420-R after the codeword 502 is transformed back to the first format 400 of the codeword 402. The memory control circuit will determine if there is a symbol error in one of the restored data symbols 418-R(0)-418-R(7) using the restored data symbols 418-R(0)-418-R(7) and the restored ECC symbols 416-R(0)-416-R(1) as inputs, but no parity error indication will be generated. In this case, the error in one of the restored data symbols 418-R(0)-418-R(7) is located and corrected using the ECC algorithm.

As another example, a single bit error may instead occur in the second data portion 512 (e.g., in one of the data bits 506(6)-506(7) in the bit pair 411(0)). In this case, the memory control circuit will determine there is a parity error and generate the parity error indication. In addition, because the merged first data portion 508, in particular the merged data symbol 510(0), is XORed with the second data portion 512, in particular the data bits 506(6) and 506(7), in the process of demerging the merged first data portion 508, a symbol error will be generated in the restored data symbols 418-R(0) due to the parity error in the bit pair 411(0). Thus, the memory control circuit will also determine if there is a symbol error in the restored data symbol 418-R(0) using the restored ECC symbols 416-R(0)-416-R(1). As above, the symbol error in the restored data symbol 418-R(0) can be corrected with the ECC algorithm using the restored ECC symbols 416-R(0)-416-R(1). In addition, the ECC algorithm can determine whether the symbol error is in the data bits 404(0)-404(2) (restored from the data bits 506(0)-506(2)) or the data bits 404(3)-404(5) (restored from the data bits 506(3)-506(5)). This will indicate whether the error was in the first one of the data bits 506(7) or the second one of the data bits 506(6) in the bit pair 411(0). Since the location of the parity error is known, the parity error can be corrected using a parity algorithm.

The case of an error occurring in the metadata bits 518(0)-518(1) is similar to the case above of an error in the second data portion because the metadata bits 518(0)-518(1) are also protected by the parity bits 516(0)-516(1) and the second merged ECC symbol 514(1) is demerged by XORing the first symbol bits 520(6)-520(8) with the first one of the metadata bits 518(0)-518(1) and XORing the second symbol bits 520(9)-520(11) with the second one of the metadata bits 518(0)-518(1). The symbol error will be found and located in the restored second ECC symbol 416-R(1), and a parity error will be found. In this regard, the parity error can be corrected based on the location of the symbol error.

Figure 6A:
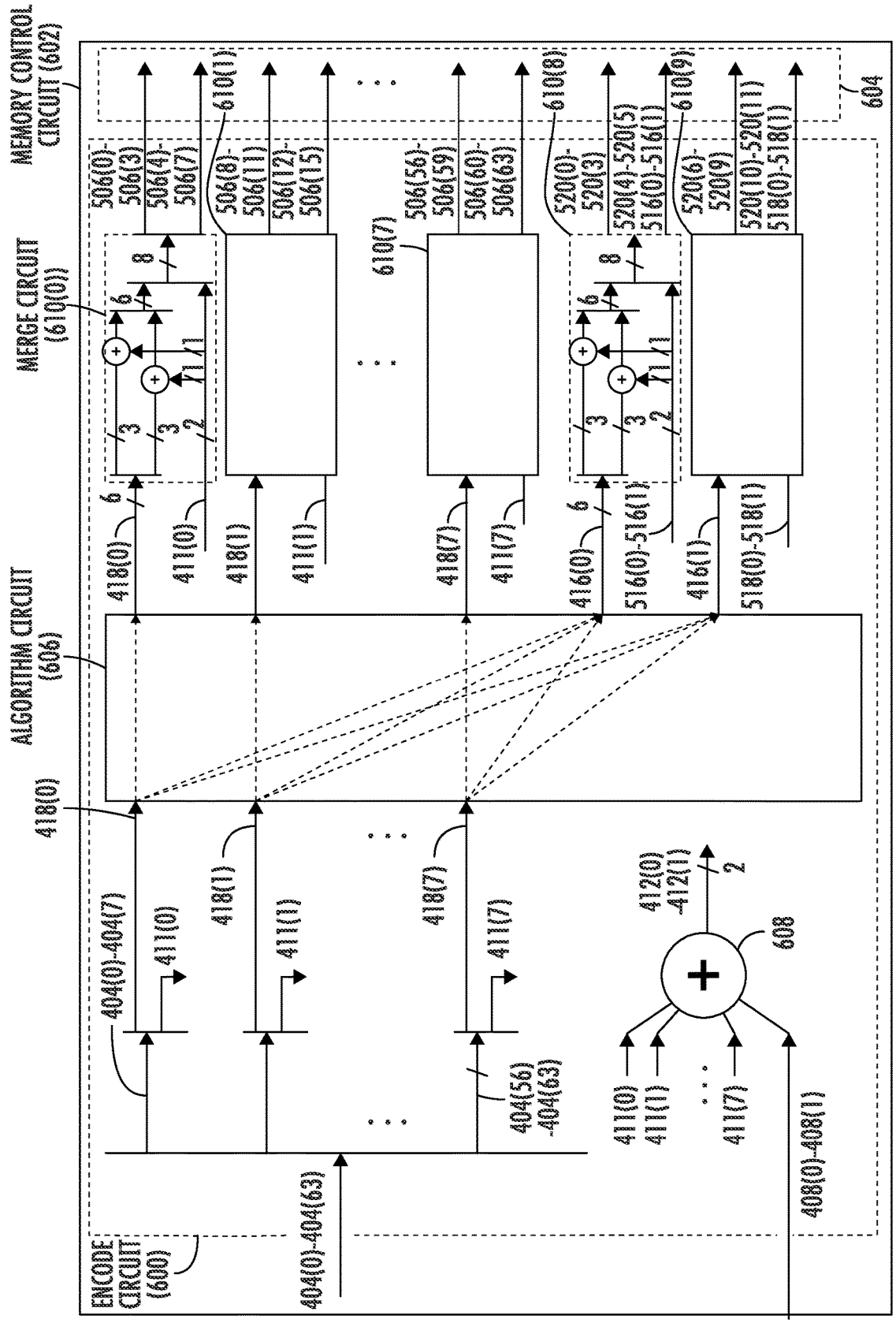
FIG. 6A is a logic diagram illustrating encoding a codeword received in a memory control circuit from a processor storage for storage to a memory module in a memory write operation integrating ECC protection and parity protection.

FIG. 6A illustrates an encode circuit 600 of a memory control circuit 602 for generating the codeword 502 in the second format 500 with a reduced number of bits used for error protection to increase utilization of memory. Operation of the encode circuit 600 is described with reference to features of the first format 400 of the codeword 402 in FIG. 4 and features of the second format 500 of the codeword 502 in FIG. 5. The memory control circuit 602 is configured to couple to a memory module on a data bus 604, over which the codeword 502 is transferred to the memory module in a memory write operation. The encode circuit 600 is configured to receive data (e.g., from a processor), including the plurality of data bits 404(0)-404(63) from a processor (not shown) in response to memory write instruction. The data bits 404(0)-404(63) are split among the data symbols 418(0)-418(7) and the bit pairs 411(0)-411(7). The data symbols 418(0)-418(7) are provided to an algorithm circuit 606 that generates the first ECC symbol 416(0) and the second ECC symbol 416(1).

The encode circuit 600 also receives metadata bits 408(0)-408(1) (i.e., bit pair 411(9)) that provide information about the data bits 404(0)-404(63). The bit pairs 411(0)-411(7) and the bit pair 411(9) are provided to a parity generation circuit 608 that generates parity bits 412(0)-412(1).

Merge circuits 610(0)-610(7) merge the data symbols 418(0)-418(7) and the bit pairs 411(0)-411(7) to generate the merged data symbols 510(0)-510(7). The data bits 506(0)-506(63) are divided among eight memory circuits (i.e., eight bits each) and transferred to memory chips as described above (i.e., 4 bits per beat per memory chip) over the data bus 604. Merge circuits 610(8)-610(9) merge the ECC symbols 416(0)-416(1) with the parity bits 412(0)-412(1) (also 516(0)-516(1)) and the metadata bits 408(0)-408(1) (518(0)-518(1) in FIG. 5) to generate the merged ECC symbols 514(0)-514(1). The symbol bits 520(0)-520(5) and the parity bits 516(0)-516(1) are transferred to one of the memory chips, and the symbol bits 520(6)-520(11) together with the metadata bits 518(0)-518(1) are transferred to another memory chip over the data bus 604.

Although merging is described above as XOR operations, the exemplary aspects disclosed herein are not limited to XOR operations. Other logical operations may be employed to merge ECC and parity protection so that memory utilization may be increased.

Figure 6B:
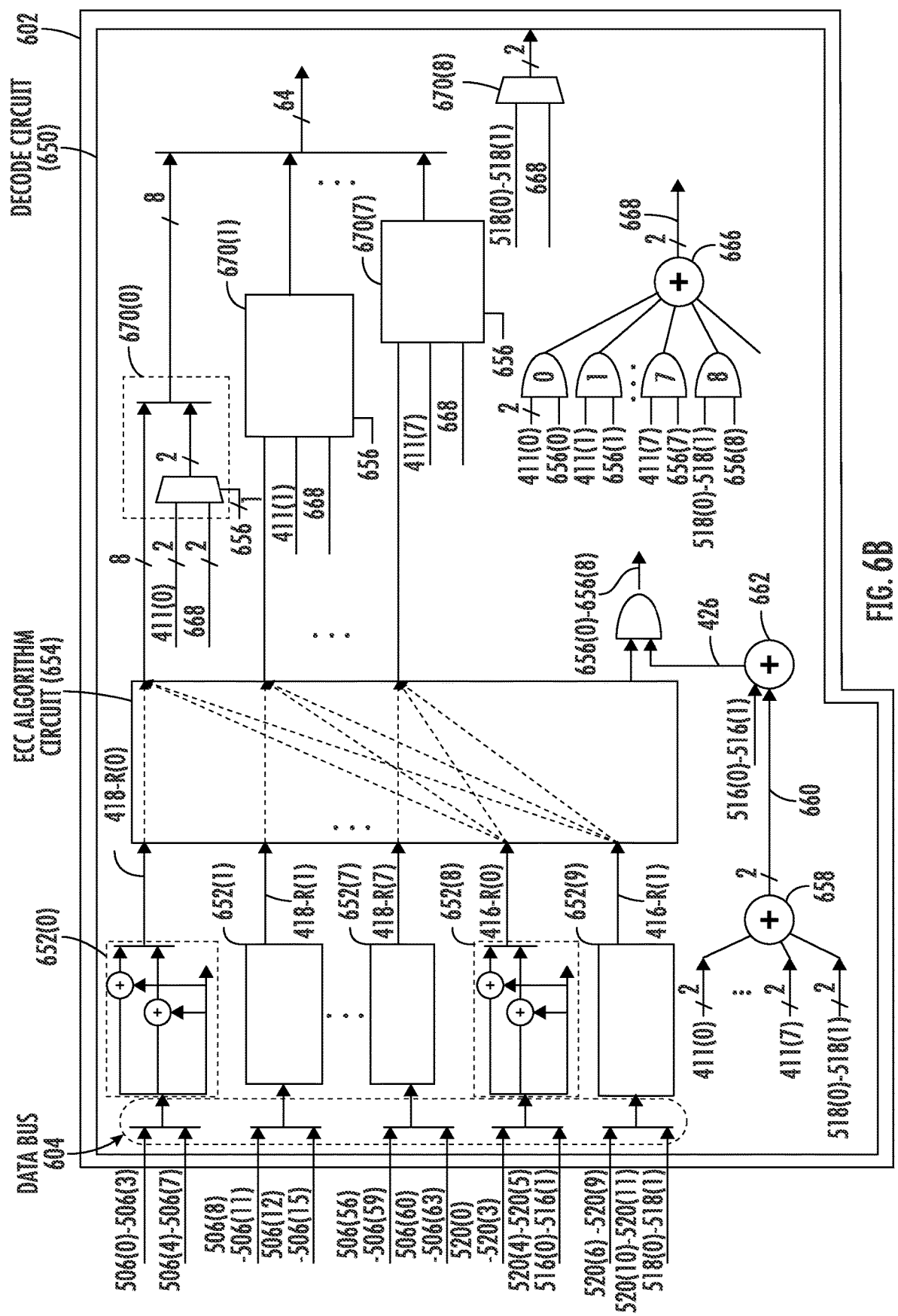
FIG. 6B is a logic diagram illustrating decoding an encoded codeword received in a memory control circuit from a memory module in a memory read operation integrating ECC protection and parity protection.

FIG. 6B illustrates a decode circuit 650 in the memory control circuit 602 for decoding a codeword 502 received on the data bus 604 from a memory module in a memory read operation. The decode circuit 650 receives the codeword 502 back on the data bus 604 as it was transferred to the memory module and, in the absence of errors, the codeword 502 is identical to the codeword 502 transferred to the memory module in a memory write operation, as described above. Specifically, the data bits 506(0)-506(63), the symbol bits 520(0)-520(11), the parity bits 516(0)-516(1), and the metadata bits 518(0)-518(1) are received in two (2) beats of the clock signal CLK.

Demerge circuits (e.g., XOR circuits) 652(0)-652(7) demerge the merged first data portion 508 based on the second data portion 512 to generate the restored first data portion 420-R. In this regard, the merged data symbols 510(0)-510(7) can be XORed with the bit pairs 411(0)-411(7). Referring to the data bits 506(0)-506(7) as an example, the data bits 506(0)-506(2) may be XORed with the data bit 506(7) and the data bits 506(3)-506(5) may be XORed with the data bit 506(6) to generate the restored data symbol 418-R(0). Restored data symbols 418-R(1)-418-R(7) are restored from the data bits 506(8)-506(63) in a similar manner by the demerge circuits 652(0)-652(7).

The restored ECC symbols 416-R(0)-416-R(1) are restored from the merged ECC symbols 514(0)-514(1) based on the parity bits 516(0)-516(1) and the metadata bits 518(0)-518(1). The restored data symbols 418-R(0)-418-R(7) and the restored ECC symbols 416-R(0)-416-R(1) are provided to an ECC algorithm circuit 654, which determines whether there is a symbol error in one of the restored data symbols 418-R(0)-418-R(7). If an error is found, the error location will be indicated by a bit in the error indicators 656(0)-656(8). The one of the restored data symbols 418-R(0)-418-R(7) with the error indicated by the error indicators 656(0)-656(7), is corrected (e.g., regenerated). Error indicator 656(8) indicates an error in the restored ECC symbol 416-R(1).

The bit pairs 411(0)-411(7) and the metadata bits 518(0)-518(1) are provided to a parity generation circuit 658, which generates parity 660. The parity 660 can be compared to the parity bits 516(0)-516(1) (e.g., in a comparator 662) to determine whether there is a parity error in one of the bit pairs 411(0)-411(7) or the metadata bits 518(0)-518(1). If a parity error is found, the parity error indication is generated. In addition, the bit pairs 411(0)-411(7), the metadata bits 518(0)-518(1), and the parity bits 516(0)-516(1) are provided to a corrected parity generator 666 to generate a parity corrected pair 668.

The bit pairs 411(0)-411(7) and the parity corrected pair 668 are provided to selector circuits 670(0)-670(7), which are controlled by the error indicators 656(0)-656(7). The metadata bits 518(0)-518(1) and the parity corrected pair 668 are provided to selector circuit 670(8), which is controlled by the error indicators 656(8). The error indicators 656(0)-656(8) control the selectors 670(0)-670(8) to replace the one of the bit pairs 411(0)-411(7) and the metadata bits 518(0)-518(1) that contains an error with the parity corrected pair 668.

The data bits 404(0)-404(63) and the metadata bits 518(0)-518(1) without errors are returned to the processor to complete the memory read operation.

Figure 7A:
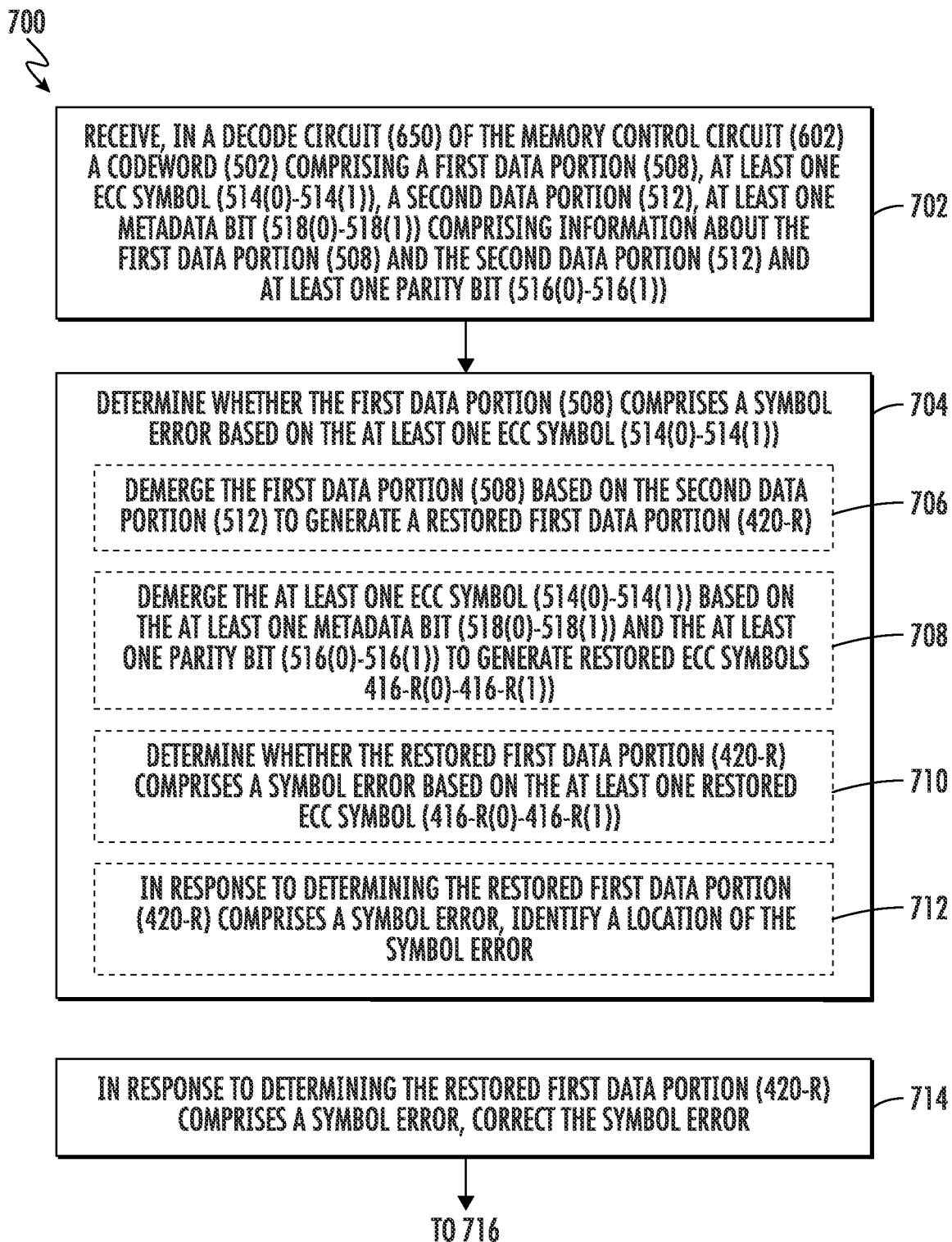
FIGS. 7A-7B are a flowchart illustrating a process of decoding an exemplary codeword as disclosed herein according to the logic diagram in FIG. 6B.
Figure 7B:
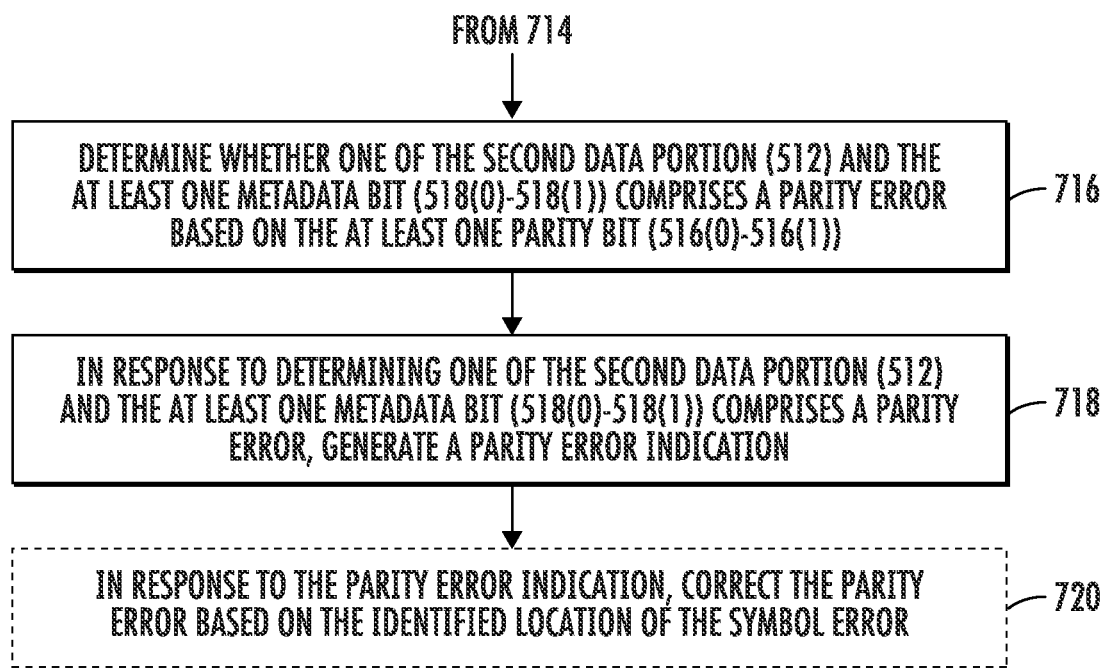

FIG. 7 is a flowchart illustrating an exemplary process 700 of decoding a codeword 644 as disclosed with reference to FIG. 6B to increase utilization of memory without reducing a level of error protection. The process 700 includes receiving, in a decode circuit 650 of the memory control circuit 602, a codeword 502 comprising a first data portion 508, a plurality of merged ECC symbols 514(0)-514(1), a second data portion 512, a plurality of metadata bits 518(0)-518(1) comprising information about the first data portion 508 and the second data portion 512, and a plurality of parity bits 516(0)-516(1) (block 702). The process includes determining whether the first data portion 508 comprises a symbol error based on the plurality of merged ECC symbols 514(0)-514(1) (block 704). In some examples, determining whether the first data portion 508 comprises a symbol error includes demerging the first data portion 508 based on the second data portion 512 to generate a restored first data portion 420-R (block 706) and demerging the plurality of merged ECC symbols 514(0)-514(1) based on the plurality of metadata bits 518(0)-518(1) and the plurality of parity bits 516(0)-516(1) to generate restored ECC symbols 416-R(0)-416-R(1) (block 708). In such examples, determining whether the first data portion 508 comprises a symbol error also includes determining whether the restored first data portion 420-R comprises a symbol error based on the plurality of restored ECC symbols 416-R(0)-416-R(1) (block 710) and, in response to determining the restored first data portion 420-R comprises a symbol error, identifying a location of the symbol error (block 712). The process 700 also includes, in response to determining the first data portion 508 comprises a symbol error, correcting the symbol error (block 714). The process further includes determining whether one of the second data portion 512 and the plurality of metadata bits 518(0)-518(1) comprises a parity error based on the plurality of parity bits 516(0)-516(1) (block 716). The process still further includes, in response to determining one of the second data portion 512 and the plurality of metadata bits 518(0)-518(1) comprises a parity error, generating a parity error indication (block 718). In the examples above, the process 700 may include, in response to the parity error indication, correcting the parity error based on the identified location of the symbol error (block 720). In particular, a parity error in the second data portion 512 would also be seen as a symbol error in the data symbols 510(0)-510(7). By locating the symbol error using the ECC symbols 514(0)-514(1), the location of the parity error would also be identified and could be fixed (e.g., by flipping polarity of the bit associated with both the parity error and the symbol error).

Figure 8:
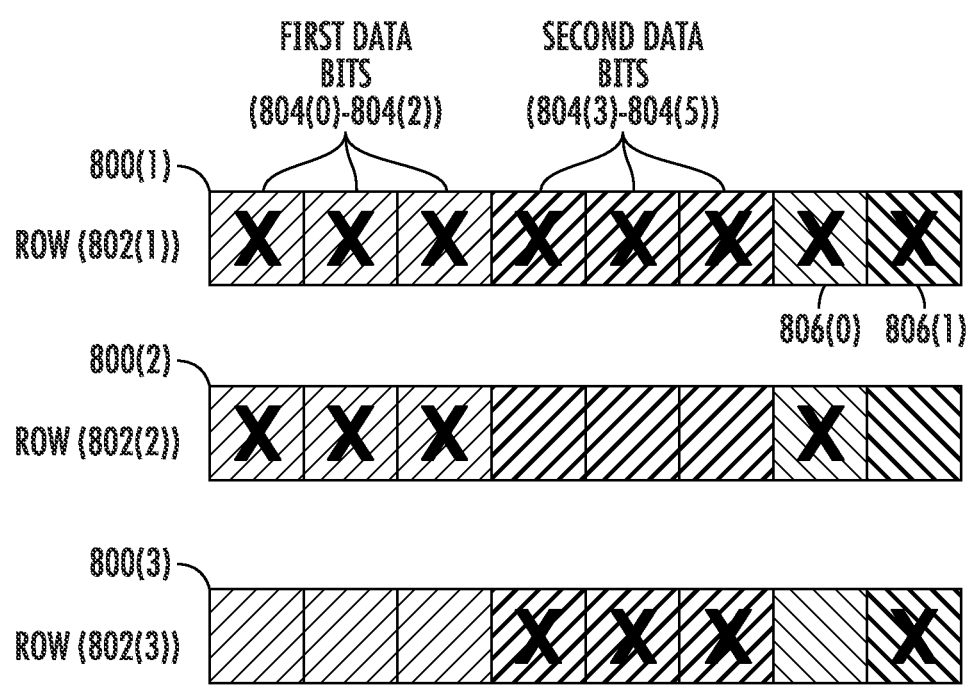
FIG. 8 illustrates examples of error patterns in data blocks that cannot be corrected by the integrated ECC and parity disclosed herein.

FIG. 8 is an illustration of combinations 800(1)-800(3) of symbol errors and parity errors in rows 802(1)-802(3) corresponding to one of the rows 414(0)-414(9) of a codeword 502 received from a memory module, as described with reference to FIGS. 5 and 6B. In each of the rows 802(1)-802(3), the integrated ECC protection and parity protection fails. The combination 800(1) is a combination of both of the combinations 800(2) and 800(3) and, therefore, is not explained separately. The rows 802(1)-802(3) include a first plurality of first data bits 804(0)-804(2) corresponding to the first data bits 506(0)-506(2) in the merged data symbol 510(0) in FIG. 5, a second plurality of data bits 804(3)-804(5) corresponding to the second data bits 506(3)-506(5) in the merged data symbol 510(0), and a bit pair 806(0)-806(1) corresponding to the bit pair 411(0) as received from a memory module in a memory read operation. In the combination 800(2), bit errors in each of the first data bits 804(0)-804(2) and the bit 806(1) will be offset by each other, so the memory circuit will not be able to determine that there is a symbol error. Similarly, in combination 800(3), bit errors in each of the second data bits 804(3)-804(5) and the bit 806(0) will be offset by each other, so the memory circuit will not be able to determine that there is a symbol error. However, the memory control circuit 602 disclosed herein provides a same level of error protection as a conventional memory circuit employing the codeword 306 in FIG. 3.

Figure 9:
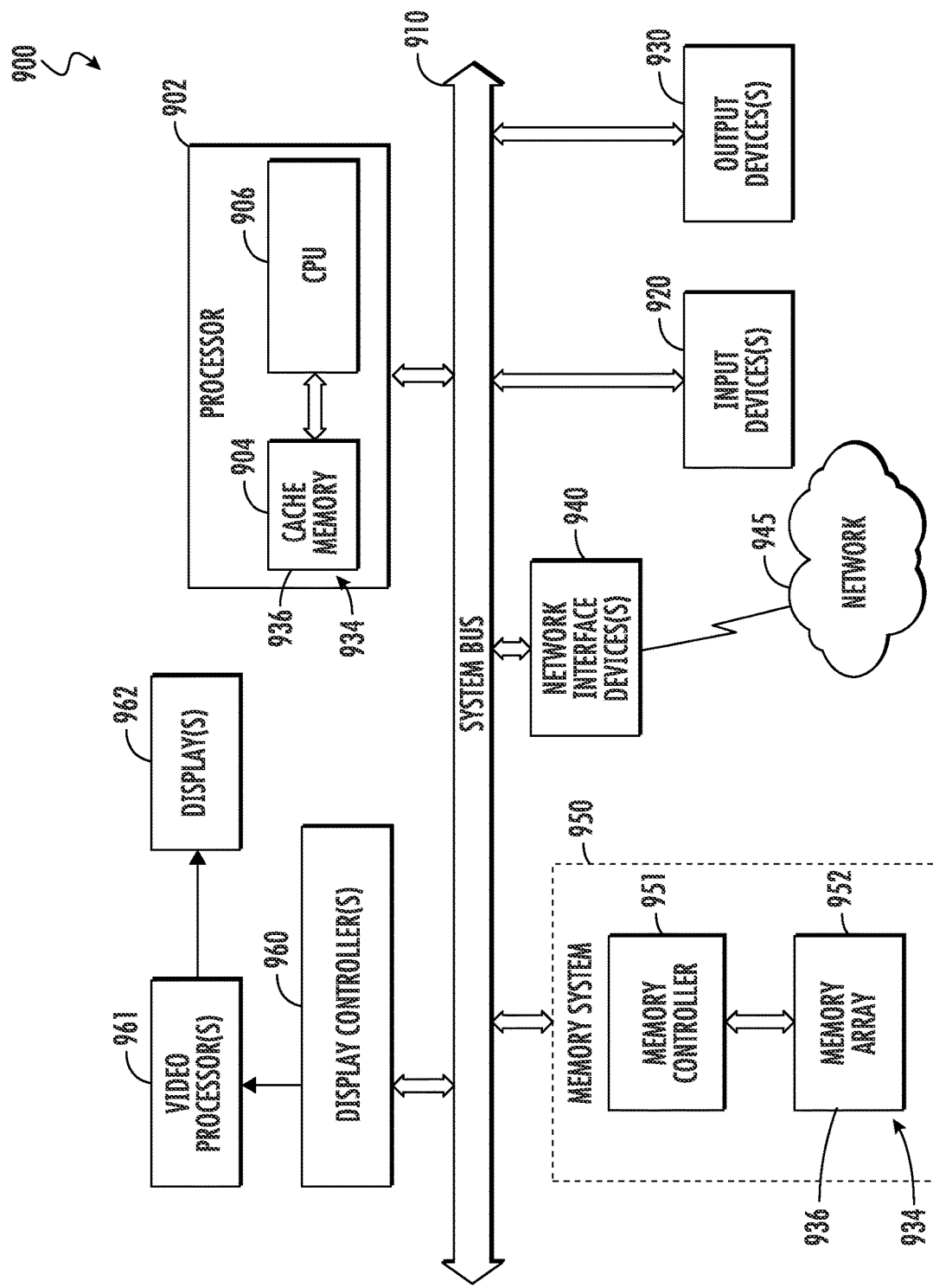
FIG. 9 is a block diagram of an exemplary computer system including a CPU that includes a plurality of CPU cores and peripheral devices, and other resources, including a memory system in which ECC and parity are integrated in a memory control circuit to provide increased memory utilization.

FIG. 9 illustrates an example of a processor-based system 900 that includes integrated ECC and parity in memory control circuits for increased memory utilization. In this example, the processor-based system 900 includes a processor 902, including a cache 904 coupled to a CPU 906. The processor 902 corresponds to the processor 102 in FIG. 1. The processor 902 is coupled to a system bus 910 and can communicate with other devices by exchanging address, control, and data information over the system bus 910. For example, the processor 902 can communicate bus transaction requests to a memory controller 951 in a memory system 950. The memory controller 951 may comprise the memory control circuits 122(A) and 122(B) in FIG. 1 and the memory control circuit 602 described with reference to FIGS. 4-6B. Although not illustrated in FIG. 9, multiple system buses 910 could be provided; wherein each system bus 910 constitutes a different fabric.

Other devices can be connected to the system bus 910. As illustrated in FIG. 9, these devices can include one or more input devices 920, one or more output devices 930, one or more network interface devices 940, and one or more display controllers 960, as examples. The input device(s) 920 can include any type of input device, including, but not limited to, input keys, switches, voice processors, etc. The output device(s) 930 can include any type of output device, including, but not limited to, audio, video, other visual indicators, etc. The network interface device(s) 940 can be any device configured to allow an exchange of data to and from a network 945. The network 945 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 940 can be configured to support any type of communications protocol desired. The memory system 950 can include the memory controller 951 coupled to one or more memory array 952.

The processor 902 may also be configured to access the display controller(s) 960 over the system bus 910 to control information sent to one or more displays 962. The display controller(s) 960 sends information to the display(s) 962 to be displayed via one or more video processors 961, which process the information to be displayed into a format suitable for the display(s) 962. The display(s) 962 can include any type of display, including, but not limited to, a cathode ray tube (CRT), a liquid crystal display (LCD), a plasma display, a light-emitting diode (LED) display, etc.

The processor-based system 900 in FIG. 9 may include a set of instructions 934 stored in the system memory 950 and/or instruction cache 904 as examples of non-transitory computer-readable medium 936. The instructions 934 may also reside, completely or at least partially, within the system memory 950 and/or within the processor 902 during their execution. The instructions 934 may further be transmitted or received over the network 945 via the network interface devices 940, such that the network 945 includes the non-transitory computer-readable medium 936.

While the non-transitory computer-readable medium 936 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The exemplary memory control circuit 602, according to aspects disclosed herein, may be provided in or integrated into any processor-based device. Examples, without limitation, include a server, a computer, a portable computer, a desktop computer, a mobile computing device, a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a wearable computing device (e.g., a smartwatch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read-Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from and write information to the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein and is to be accorded the widest scope consistent with the principles and novel features disclosed herein.

What is claimed is:

1. A memory control circuit configured to couple to a memory module on a memory interface, the memory control circuit comprising:
a decode circuit configured to:
receive a codeword from the memory module, the codeword comprising:
a first data portion;
a plurality of error correction code (ECC) symbols;
a second data portion;
a plurality of metadata bits comprising information based on the first data portion and the second data portion; and
a plurality of parity bits;
determine whether the first data portion comprises a symbol error based on the plurality of ECC symbols;
in response to determining the first data portion comprises a symbol error, correct the symbol error;
determine whether one of the second data portion and the plurality of metadata bits comprises a parity error based on the plurality of parity bits configured to indicate one or more errors in the second data portion and the plurality of metadata bits; and
in response to determining one of the second data portion and the plurality of metadata bits comprises a parity error, generate a parity error indication.

2. The memory control circuit of claim 1, wherein:
the first data portion comprises a merged first data portion;
the plurality of ECC symbols comprises a plurality of merged ECC symbols;
the decode circuit configured to determine whether the first data portion comprises a symbol error based on the plurality of ECC symbols comprises the decode circuit further configured to:
demerge the merged first data portion based on the second data portion to generate a restored first data portion comprising a plurality of restored data symbols;
demerge the plurality of merged ECC symbols based on the plurality of metadata bits and the plurality of parity bits to generate a plurality of restored ECC symbols;
determine whether the restored data portion comprises a symbol error based on the plurality of restored ECC symbols; and
in response to determining the restored data portion comprises a symbol error, identify a location of the symbol error; and
the decode circuit is further configured to, in response to the parity error indication, correct the parity error based on the location of the symbol error.

3. The memory control circuit of claim 2, wherein:
the first data portion comprises a plurality of merged data symbols, each comprising a plurality of data bits;
the second data portion comprises a plurality of bit pairs, each comprising two data bits corresponding to one of the merged data symbols; and
demerging the first data portion comprises demerging the merged data symbols based on the corresponding bit pair.

4. The memory control circuit of claim 3, wherein:
the decode circuit configured to demerge the merged data symbols based on the corresponding bit pair further comprises the decode circuit configured to, for each of the merged data symbols, exclusive-OR (XOR), the plurality of data bits of the merged data symbol with the two data bits of the corresponding bit pair.

5. The memory control circuit of claim 4, wherein:
in each of the plurality of merged data symbols, the plurality of data bits comprises first data bits and second data bits; and
the decode circuit configured to XOR the plurality of data bits of the merged data symbols with the two data bits of the corresponding bit pair further comprises the decode circuit configured to:
XOR the first data bits with a first one of the two data bits in the corresponding bit pair; and
XOR the second data bits with a second one of the two data bits in the corresponding bit pair.

6. The memory control circuit of claim 2, wherein the decode circuit configured to demerge the plurality of merged ECC symbols based on the plurality of parity bits and the plurality of metadata bits to generate a plurality of restored ECC symbols further comprises exclusive-ORing (XORing) the merged ECC symbols with the plurality of parity bits and the plurality of metadata bits.

7. The memory control circuit of claim 2, wherein the decode circuit configured to determine whether the restored first data portion comprises a symbol error based on the plurality of restored ECC symbols, comprises the decode circuit further configured to employ an algorithm using the plurality of restored ECC symbols and the plurality of restored data symbols.

8. The memory control circuit of claim 2, wherein:
each of the plurality of merged ECC symbols comprises first symbol bits and second symbol bits; and
the decode circuit configured to demerge the plurality of merged ECC symbols based on the plurality of metadata bits and the plurality of parity bits to generate a plurality of restored ECC symbols further comprises the decode circuit configured to:
exclusive-OR (XOR) each of the first symbol bits of the first merged ECC symbol with a first one of the plurality of parity bits and each of the second symbol bits of the first merged ECC symbol with a second one of the plurality of parity bits to generate a first restored ECC symbol to generate a restored first ECC symbol of the plurality of restored ECC symbols; and
XOR each of the first symbol bits of the second merged ECC symbol with a first one of the plurality of metadata bits and each of the second symbol bits of the second merged ECC symbol with a second one of the plurality of metadata bits to generate a restored second ECC symbol of the plurality of restored ECC symbols.

9. The memory control circuit of claim 7, wherein the decode circuit configured to identify a location of the symbol error, further comprises the decode circuit configured to identify one of the plurality of restored data symbols comprising the symbol error.

10. The memory control circuit of claim 1, further comprising:
an encode circuit configured to:
receive:
a plurality of write data bits; and
a second plurality of metadata bits comprising information based on the plurality of write data bits;
generate a second plurality of ECC symbols based on a first write data portion of the plurality of write data bits;

generate a second plurality of parity bits based on a second write data portion of the plurality of write data bits and the second plurality of metadata bits.

11. The memory control circuit of claim 10, the encode circuit further configured to:
merge the first write data portion with the second write data portion to generate a merged first write data portion;
merge the second plurality of ECC symbols with the second plurality of metadata bits and the second plurality of parity bits to generate a second plurality of merged ECC symbols; and
generate a codeword comprising:
the merged first write data portion;
the second write data portion;
the second plurality of metadata bits;
the second plurality of parity bits; and
the second plurality of metadata bits.

12. The memory control circuit of claim 1, integrated into an integrated circuit (IC).

13. The memory control circuit of claim 1, further integrated into a device selected from a group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a wearable computing device (e.g., a smartwatch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

14. A method of error recovery in a memory access operation in a memory control circuit configured to couple to a memory module on a memory interface, the method comprising:
receiving, in a decode circuit of a memory control circuit, a codeword from the memory module, the codeword comprising:
a first data portion;
a plurality of error correction code (ECC) symbols;
a second data portion;
a plurality of metadata bits comprising information related to the first data portion and the second data portion; and
a plurality of parity bits;
determining whether the first data portion comprises a symbol error based on the plurality of ECC symbols;
in response to determining the first data portion comprises a symbol error, correcting the symbol error;
determining whether one of the second data portion and the plurality of metadata bits comprises a parity error based on the plurality of parity bits configured to indicate one or more errors in the second data portion and the plurality of metadata bits; and
in response to determining one of the second data portion and the plurality of metadata bits comprises a parity error, generating a parity error indication.

15. The method of claim 14, wherein:
the first data portion comprises a merged first data portion;
the plurality of ECC symbols comprises a plurality of merged ECC symbols;
determining whether the first data portion comprises a symbol error based on the plurality of ECC symbols comprises:
demerging the merged first data portion based on the second data portion to generate a restored first data portion;
demerging the plurality of merged ECC symbols based on the plurality of metadata bits and the plurality of parity bits to generate a plurality of restored ECC symbols;
determining whether a demerged first data portion comprises a symbol error based on a plurality of demerged ECC symbols; and
in response to determining the demerged first data portion comprises a symbol error, identifying a location of the symbol error; and
the method further comprises:
in response to a parity error indication, correcting the parity error based on the identified location of the symbol error.

16. The method of claim 15, wherein:
receiving the codeword from the memory module on the memory interface comprising the second data portion further comprises receiving a plurality of merged data symbols and a plurality of bit pairs on the memory interface;
each merged data symbol comprises a plurality of data bits; and
each bit pair comprises two data bits corresponding to one of the merged data symbols.

17. The method of claim 16, wherein:
demerging the first data portion based on the second data portion further comprises exclusive-ORing (XORing), the plurality of data bits of the merged data symbols with the two data bits of the corresponding bit pair.

18. The method of claim 17, wherein:
in each of the plurality of merged data symbols, the plurality of data bits comprises first data bits and second data bits; and
XORing the plurality of data bits of the merged data symbols with the two data bits of the corresponding bit pair further comprises:
XORing the first data bits with a first one of the two data bits in the corresponding bit pair; and
XORing the second data bits with a second one of the two data bits in the corresponding bit pair.

19. The method of claim 16, wherein demerging the plurality of merged ECC symbols based on the plurality of parity bits and the plurality of metadata bits, further comprises exclusive-ORing (XORing) the merged ECC symbols with the plurality of parity bits and the plurality of metadata bits.

20. The method of claim 15, wherein determining whether the restored first data portion comprises a symbol error based on the plurality of restored ECC symbols, comprises employing an algorithm using the plurality of restored ECC symbols and the plurality of restored data symbols.

21. The method of claim 20, wherein:
each of the plurality of merged ECC symbols comprises first symbol bits and second symbol bits; and
demerging the plurality of merged ECC symbols based on the plurality of metadata bits and the plurality of parity bits to generate a plurality of restored ECC symbols further comprises:
exclusive-ORing (XORing) each of the first symbol bits of the first merged ECC symbol with a first one of the plurality of parity bits and each of the second symbol bits of the first merged ECC symbol with a second one of the plurality of parity bits to generate a first restored ECC symbol to generate a restored first ECC symbol of the plurality of restored ECC symbols; and XORing each of the first symbol bits of the second merged ECC symbol with a first one of the plurality of metadata bits and each of the second symbol bits of the second merged ECC symbol with a second one of the plurality of metadata bits to generate a restored second ECC symbol of the plurality of restored ECC symbols.

22. The method of claim 21, wherein identifying a location of the symbol error further comprises identifying one of the plurality of restored data symbols comprising the symbol error.

23. The method of claim 14, further comprising:
receiving:
  a plurality of write data bits; and
  a second plurality of metadata bits comprising information based on the plurality of write data bits;
generating a second plurality of ECC symbols based on a first write data portion of the plurality of data bits;
generating a second plurality of parity bits based on a second write data portion of the plurality of write data bits and the second plurality of metadata bits.

24. The method of claim 23, wherein:
merging the first write data portion of the plurality of write data bits with the second write data portion of the plurality of write data bits to generate a merged first write data portion; and
merging the second plurality of ECC symbols with the second plurality of metadata bits and the second plurality of parity bits to generate a plurality of merged ECC symbols; and generating a codeword comprising:
  the merged first write data portion;
  the second write data portion;
  the second plurality of metadata bits;
  the second plurality of parity bits; and
  the second plurality of metadata bits.

25. A non-transitory computer-readable medium comprising instructions which, in response to being executed by a processor coupled to a memory control circuit configured to couple to a memory module on a memory interface, cause the memory control circuit to:
receive a codeword from the memory module, the codeword comprising:
  a first data portion;
  a plurality of error correction code (ECC) symbols;
  a second data portion;
  a plurality of metadata bits comprising information based on the first data portion and the second data portion; and
  a plurality of parity bits;
determine whether the first data portion comprises a symbol error based on the plurality of ECC symbols;
in response to determining the first data portion comprises a symbol error, correct the symbol error;
determine whether one of the second data portion and the plurality of metadata bits comprises a parity error based on the plurality of parity bits configured to indicate one or more errors in the second data portion and the plurality of metadata bits; and
in response to determining one of the second data portion and the plurality of metadata bits comprises a parity error, generate an error indication.

\* \* \* \* \*